US012673758B2

(12) United States Patent
Rey et al.

(10) Patent No.: US 12,673,758 B2
(45) Date of Patent: Jul. 7, 2026

(54) SUPERCONDUCTING MAGNETOHYDRODYNAMIC DRIVE

(71) Applicant: Tai-Yang Research Company, Powell, TN (US)

(72) Inventors: Christopher M. Rey, Powell, TN (US); Benjamin S. Andrews, Tallahassee, FL (US); Trever H. Carnes, Tallahassee, FL (US)

(73) Assignee: Tai-Yang Research Company, Powell, TN (US)

( * ) Notice: Subject to any disclaimer, the term of this patent is extended or adjusted under 35 U.S.C. 154(b) by 218 days.

(21) Appl. No.: 18/799,017

(22) Filed: Aug. 9, 2024

(65) Prior Publication Data

US 2026/0070639 A1 Mar. 12, 2026

Related U.S. Application Data

(60) Provisional application No. 63/579,644, filed on Aug. 30, 2023.

(51) Int. Cl.
*B63H 19/00* (2006.01)
*H01F 6/04* (2006.01)

(52) U.S. Cl.
CPC ............... *B63H 19/00* (2013.01); *H01F 6/04* (2013.01)

(58) Field of Classification Search
CPC .................................. B63H 19/00; H01F 6/04
See application file for complete search history.

(56) References Cited

U.S. PATENT DOCUMENTS 5,350,966 A * 9/1994 Culp ..................... B63H 19/00 440/6

FOREIGN PATENT DOCUMENTS

JP H06253410 A * 9/1994
KR 20150063240 A * 6/2015 ................ B63J 3/00

* cited by examiner

*Primary Examiner* — Stephen P Avila
(74) *Attorney, Agent, or Firm* — TechnicalAttorney; Rick Barnes

(57) ABSTRACT

A magnetohydrodynamic propulsion device (MHD), having a superconducting magnet, a cryogenic refrigeration system adapted to cool the superconducting magnet, a vacuum cryostat surrounding the superconducting magnet, an electrode pair, and a housing adapted to mount the MHD to a vessel, wherein the superconducting magnet and the electrode pair are adapted to receive electrical power and generate a magnetic field, an electric field, and an electrode current density to produce thrust in an electrically conducting medium in contact with the MHD.

20 Claims, 15 Drawing Sheets

SUPERCONDUCTING MAGNETOHYDRODYNAMIC DRIVE

PRIORITY

This application is a non-provisional of and claims all benefits and priority to U.S. provisional patent application Ser. No. 63/579,644 filed 2023 Aug. 30, the entirety of the disclosure of which is incorporated herein by reference, as if reproduced in full.

FIELD

This disclosure relates to the field of marine propulsion. More particularly, this disclosure relates to magnetohydrodynamic drive (MHD) using at least one of a superconducting (SC) magnet and a cryogenic cooling system configured to cool the SC magnet.

INTRODUCTION

MHDs are useful in a wide variety of marine propulsion applications including, for example, ships, submarines, unmanned surface vehicles, and unmanned underwater vehicles, among other types of marine vessels.

Unfortunately, MHDs that use SC magnets with active cryogenic refrigeration systems tend to generate unwanted noise from the operation of cryogenic refrigeration system. An active cryogenic refrigeration system is a system that requires electrical power to operate at least one or more cryogenic refrigerators, which is then used to cool the SC magnets and its ancillary support equipment. In active cryogenic refrigeration systems, however, unwanted noise from the cryogenic refrigerator itself generates an identifiable acoustic signature, which can reduce the vessel's stealthiness.

A passive cryogenic refrigeration system, by contrast, is a system that does not require electrical power to operate, and instead uses at least one cryogenic fluid as a thermal energy storage system. In a passive cryogenic system, the cryogenic fluid is used to cool the SC magnet and its ancillary support equipment. There are many cryogenic fluids that are useful, including but not limited to solids and liquids of materials such as helium, nitrogen, hydrogen, methane, oxygen, and argon, among many other types of cryogenic fluids. Unfortunately, passive cryogenic systems require a periodic refill of the cryogenic fluid, thus limiting the duration that they can operate between cryogenic replenishment.

Furthermore, MHDs that use low temperature superconducting (LTS) magnets suffer from a variety of technical challenges, including but not limited to lower B-fields, and hence generate lower $F_L$, which translates into lower $F_{Th}$. MHDs based upon LTS magnets also suffer from lower propulsion efficiency, are more susceptible to quench, and have more costly and complex refrigeration systems, among other technical challenges. Furthermore, some SC magnet designs are more susceptible to large stray fringe B-fields and AC losses, which make them easier to magnetically detect, and require larger cryogenic refrigeration systems.

What is needed, therefore, is an MHD that tends to reduce issues such as those described above, at least in part.

SUMMARY

The above and other needs are met by a magnetohydrodynamic propulsion device (MHD), having a superconducting magnet, at least one of an active cryogenic refrigeration system and a passive cryogenic refrigeration system adapted to cool the superconducting magnet, a vacuum cryostat surrounding the superconducting magnet, an electrode pair, and a housing adapted to mount the MHD to a vessel, wherein the superconducting magnet and the electrode pair are adapted to receive electrical power and generate a magnetic field, an electric field, and an electrode current density to produce thrust in an electrically conducting medium in contact with the MHD.

In some embodiments according to this aspect of the invention, the housing is at least one of an axial duct, a radial duct, and a ductless configuration. In some embodiments, the housing is at least one of an inline unit internal to the vessel, an inline unit external to the vessel, and an external unit in at least one pod. In some embodiments, the superconducting magnet is at least one of a racetrack dipole magnet, canted cosine theta dipole magnet, saddle dipole magnetic, overpass/underpass dipole magnet, common coil dipole magnet, and segmented toroid magnet. In some embodiments, the superconducting magnet is at least one of an HTS magnet and an LTS magnet. In some embodiments, the superconducting magnet is adapted to receive at least one of DC electrical power and AC electrical power. In some embodiments, the electrode pair is adapted to receive at least one of DC electrical power and AC electrical power. In some embodiments, the superconducting magnet is adapted to receive at least one of DC electrical power and AC electrical power. In some embodiments, the cryogenic refrigeration system is at least one of an active cryogenic refrigerator, and passive cryogenic system with thermal energy storage. Some embodiments include at least one of a persistent mode switch, semi-persistent mode switch, and intelligent current lead.

According to another aspect of the disclosure, a method of generating a thrust in an electrically conductive medium is described. A magnetohydrodynamic propulsion device (MHD) is provided, having a superconducting magnet, a cryogenic refrigeration system adapted to cool the superconducting magnet, a vacuum cryostat surrounding the superconducting magnet, an electrode pair, and a housing adapted to mount the MHD to a vessel. The MHD is immersed in the electrically conductive medium. The superconducting magnet and the electrode pair are adapted to receive electrical power and generate a magnetic field, an electric field, and an electrode current density to produce the thrust in the electrically conducting medium.

In various embodiments according to this aspect of the disclosure, the electrically conductive medium is sea water. In some embodiments, the housing is disposed inside the vessel. In some embodiments, the housing is attached externally to a hull of the vessel. In some embodiments, the thrust can be reversed by reversing a polarity of the electrical power. In some embodiments, the thrust can be reversed by rotating the superconducting magnet by 180°. In some embodiments, the thrust can be reversed by simultaneously switching a polarity of both the electrode and the superconducting magnet. In some embodiments, a magnitude of the thrust is varied by adjusting a current applied to the superconducting magnet. In some embodiments, a magnitude of the thrust is varied by adjusting a voltage applied across the electrode pair.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
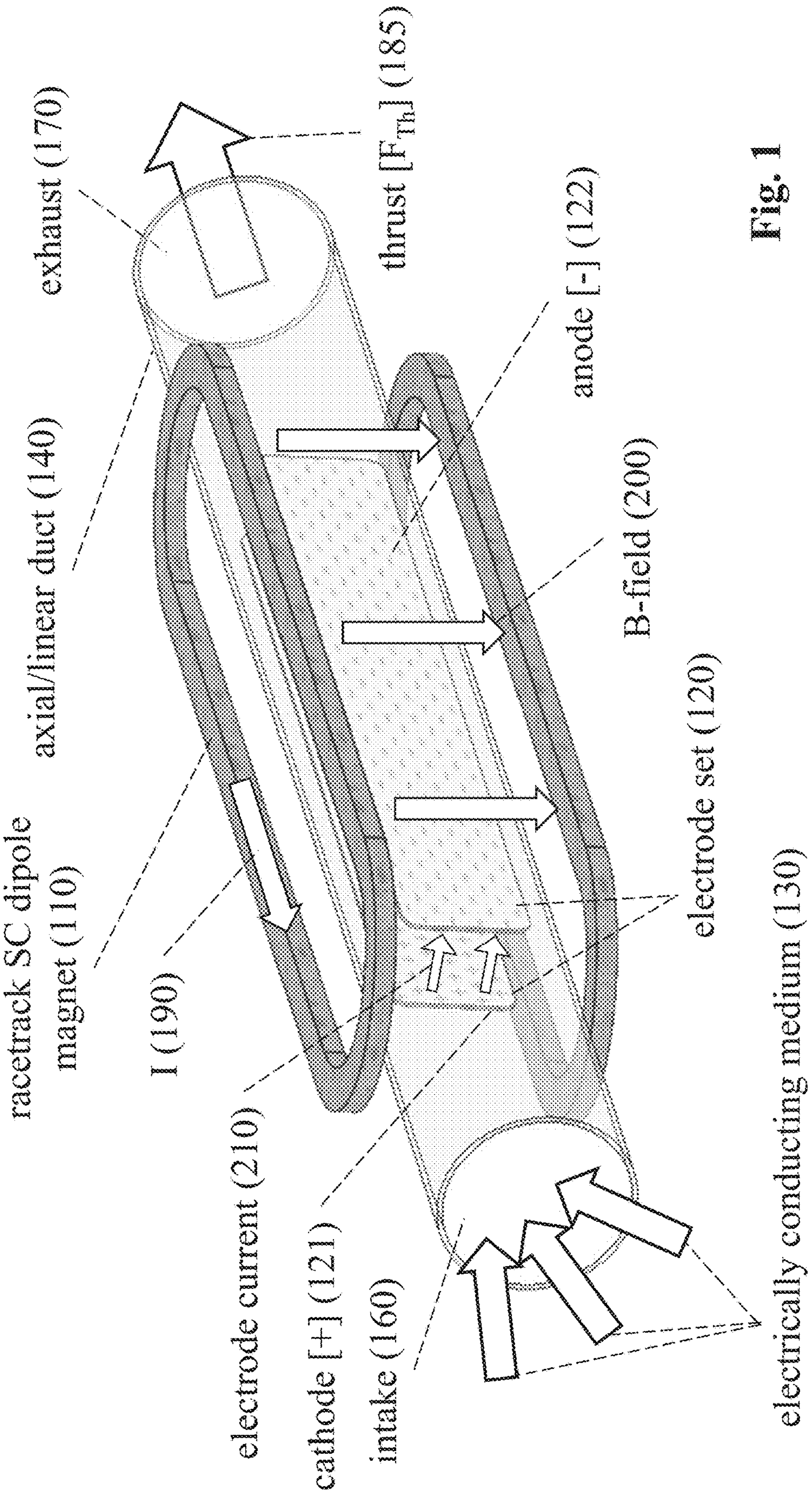
FIG. 1 is an internal depiction of an MHD using an axial duct for its geometrical mounting configuration, with a simple racetrack dipole SC magnet and parallel plate electrodes located in the bore of the racetrack dipole SC magnet, according to an embodiment of the present disclosure.

One benefit of the MHD described in this disclosure is that it does not use any type of rotating shaft or other type of mechanical-motion-induced propulsion, such as a rotating propeller, rotating screw, pumpjet, jet, internal propulsor, and so forth, all generally referred to herein as an impeller.

Instead of an impeller, when a magnetic field (B-field) is spatially located at right angles to an electric field (E-field) and an electrically conductive medium (e.g., seawater) is passed between the combined magnetic and electric fields, the conductive medium experiences a Lorentz force ($F_L$). This Lorentz force can, over time, move a volume of the electrically conducting medium (seawater) at a certain velocity, which can generate a forward or reverse thrust ($F_{Th}$). This direct seawater propulsion method greatly reduces noise generated by rotating equipment and cavitation from an impeller. Thus, such an MHD is acoustically quieter and stealthier than traditional propulsion systems. The MHD can be combined with a traditional impeller, if desired. In some embodiments, the impeller could be used when stealth propulsion is not required, and the MHD could be used when quieter and stealthier operation is desired, or they could be used together in some combination.

For the MHD described in this disclosure, the design, use, fabrication, and operational methods of the B-field and E-field needed for marine propulsion are disclosed. To increase the B-field (and hence the thrust and propulsion efficiency) in a small, compact configuration, while simultaneously consuming a reduced amount of electrical power, SC magnets are used for the MHD. SC magnets come in three basic variants: a) low temperature superconducting (LTS), b) high temperature superconducting (HTS), and c) hybrid LTS-HTS, which have a combination of both. The single term "superconducting," abbreviated as SC, is used to describe at least one of an LTS, HTS, and LTS-HTS hybrid magnet, unless specially noted otherwise herein.

Definitions

The terms, acronyms, and explanations listed below are provided for convenience and are not to be taken as binding for claim construction.

| Symbol | Definition | Units (if applicable) |
|---|---|---|
| AC | Alternating Current | Root mean squared current in Amperes (Arms) |
| Ag | Silver | |
| Al | Aluminum | |
| Al—Ni—Co | Permanent magnet | |
| B or B-field | Magnetic Flux Density | T |
| Cu | Copper | |
| CCT | Canted Cosine Theta | |
| CICCn | Cable-in-Conduit-Conductor | |
| CORC | Cable on Round Core | |
| Cu—Sn | Bronze | |
| $\Delta T = T_f - T_i$ | Operating temperature range | K |
| DC | Direct Current | Amperes (A) |
| E-field | Electric field | V/m |
| $F_L$ | Lorentz force | N |
| $F_{Th}$ | Thrust | N |
| Fe | Iron | |
| H | Magnetic Field Strength | A-turn/m |
| $I_{magnet}$ | Magnet current | A |
| $J_{electrode}$ | Electrode current density | $A/m^2$ |
| LCH4/SCH4 | Liquid/Solid methane | TES material |
| LH2/SH2 | Liquid/Solid hydrogen | TES material |
| LHe | Liquid helium | TES material |
| LN2/SN2 | Liquid/Solid nitrogen | TES material |
| LNe/SNe | Liquid/Solid neon | TES material |
| M | Magnetization | A/m |
| Y | Yttrium | |
| $\mu_r$ | Relative magnetic permeability | dimensionless quantity |
| $\mu_0$ | Magnetic permeability of free space | (H/m) |
| Mg—B | Magnesium-Boride | LTS material |
| Nd—Fe—B | Neodymium-Iron-Boron | Permanent magnet |
| NbTi | Niobium-Titanium | LTS material |
| Nb—Sn | Niobium-Tin | LTS materials |
| ρ | Electrical resistivity | (Ω-m) |
| Re | Rare-earths | |
| σ | Electrical conductivity | Siemens |
| SCH4 | Solid methane | TES material |
| SH2 | Solid hydrogen | TES material |
| SN2 | Solid nitrogen | TES material |
| Sm—Co | Samarium-Cobalt | Permanent magnet |
| $T_c$ | Critical Temperature | K |
| $T_{cs}$ | Current sharing temperature | K |
| $\Delta t_m$ | Mission time | Second, minutes, hours |
| t-NIHC | Transient-Non-Isothermal Heat Capacity | MHD Operational mode |
| TES | Thermal Energy Storage | |
| USV | Unmanned Surface Vehicle | |
| UUV | Unmanned Underwater Vehicle | |
| $V_{electrode}$ | Electrode voltage | V |

General Overview

The present disclosure describes an apparatus adapted to generate marine propulsion ($F_{Th}$) using a combination of at least one high magnetic field that is spatially oriented with at least one of its vector components at right angles (or mostly right angles) to at least one electric field. In some embodiments, the high B-field and the E-field are electrically powered by a direct current (DC) power source. This is referred to as a conductive MHD approach. In some embodiments, it can be advantageous to power at least one of the B-field and the E-field using at least one alternating current (AC) power source. This is referred to as an inductive MHD approach.

Some of the shortcomings from prior art and other needs are met by an MHD that utilizes HTS magnets or alternatively an LTS-HTS hybrid magnet to generate the required high B-field. Increasing the B-field in an MHD increases both the net thrust and raises the efficiency of the propulsion system. In addition, a cryogenic refrigeration system that can be configured to reduce its noise signature synergistically combined with a SC magnet design that can be configured to reduce its external magnetic signature is advantageous, thereby making the MHD more stealthy and harder to detect. The embodiments described in this disclosure describe an MHD using SC magnets and a cryogenic cooling system with increased thrust, higher propulsion efficiency, lower acoustic noise signature, and lower magnetic signature than the prior art.

MHDs have been separated into two basic types: a) conductive and b) inductive. For conductive MHDs described in this disclosure, the thrust is generated by a steady state or nearly steady state DC B-field and current flow between at least two or more electrodes. The electrodes include at least one cathode with positive (+) polarity and at least one anode with negative (−) polarity. For inductive MHDs described in this disclosure, the thrust is generated by either a pure AC B-field or a combination of both a DC and AC B-field. However, inductive MHD does not require electrodes (i.e. electrodeless). Both a conductive MHD and an inductive MHD have their advantages and disadvantages, depending upon the application, and a description of one type in this disclosure versus another is not meant to limit or restrict applications of the various embodiments.

MHDs are further separated into three basic electromagnetic (E-M) action types: a) external, b) internal, and amalgam. In the external type, the MHD vessel is propelled by the E-M force generated in the seawater surrounding the vessel. This uses a so-called ductless or open geometrical mounting architecture. The ductless architecture can be mounted directly in the hull of the marine vessel, which helps reduce overall drag by avoiding the drag from the ducted design altogether. However, the B-field strength of the external or ductless types tends to be smaller and have a larger external magnetic signature than the internal or ducted mounting architecture.

In the internal type, the MHD vessel is propelled by seawater that is funneled through a duct similar to a water jet design. There are at least two internal or ducted geometrical mounting configurations: a) an axial or linear duct, which runs along the hull of a vessel, or b) a radial or annular duct. The axial duct can be mounted either internally or externally to the vessel. The radial duct can be mounted in a pod that is external to the vessel.

In the amalgam type, the MHD vessel is propelled by the E-M force generated in the seawater surrounding the vessel, similar to the external type. However, this is synergistically combined with an internal duct having magnetic permeable material that helps shield as well as shape the B-field, to reduce the vessel's external magnetic signature, and also improve propulsion efficiency. This magnetic permeable material serves a similar function to the back-iron in an electric motor or generator.

Both the external and internal E-M action types, along with their various MHD geometrical mounting configurations, have their own advantages and disadvantages, and a detailed description of one geometrical mounting configuration versus another in this disclosure is not meant to limit or restrict applications of the various embodiments. It is understood by one skilled in the art that a description of one type of SC magnet and cryogenic cooling system as applied to one type of geometrical mounting system can also be adapted to the other types of geometrical mounting systems.

In various embodiments, the HTS magnets are formed using at least one of HTS wire, tape, cable, and cable-in-conduit-conductor (CICC). In some embodiments, the HTS wire is formed of at least one of Re—Ba—Cu—O, Bi—Pb—Sr—Ca—Cu—O, Tl—Ba—Ca—Cu—O, and Hg—Ba—Ca—Cu—O. In some embodiments, LTS magnets are formed using at least one of LTS wire, tape, cable, and CICC. In some embodiments, the LTS wire is formed of at least one of NbTi, Nb—Sn, Nb—Al, and Mg—B. The terms wire, tape, and conductor generally have the same meaning, and are used interchangeably throughout this disclosure. Likewise, the terms cable and CICC have the same general meaning, and are used interchangeably throughout this disclosure.

In some embodiments, hybrid superconducting magnets are formed using at least one of an LTS magnet and an HTS magnet. These types of superconducting magnets will be referred to herein as LTS-HTS hybrid magnets. One advantage of an LTS-HTS hybrid magnet over a purely LTS or purely HTS is that, in general, they generate a higher B-field at a lower cost.

In some embodiments, the SC magnets are formed of at least one dipole magnet. A dipole B-field can be generated from many different types of geometries and current configurations. Some of the more typical dipole magnet configurations include, but are not limited, to racetrack coils, saddle coils, tilted solenoids, canted cosine theta (CCT) coils, overpass/underpass (OP/UP) coils, and so-called common coil dipole magnets. Some dipole magnet configurations are more advantageous than others, depending upon the type of MHD application, type of conductor (e.g. HTS or LTS), or type of mounting system (e.g. axial duct, radial duct, ductless, etc.) to the vessel. Thus, it is beyond the scope of this disclosure to describe each dipole magnet configuration in detail, and when one dipole magnet configuration is advantageous over another dipole magnet configuration. One skilled in the art of superconducting magnet design will perform the necessary calculations and design to select the dipole magnet architecture that is preferred for the application.

The terms canted solenoid, tilted solenoid, canted cosine theta (CCT) coil, all have the same general meaning and are used interchangeably throughout this disclosure. CCT solenoids are two separate coaxial solenoid coils electrically connected in series. In a CCT dipole coil, the inner solenoid coil is tilted at a predetermined angle (e.g. 30°, 45°, etc.) relative to the central axis. The outer coil is wound at the equal (or nearly equal) and opposite angle (e.g. −30°, −45°, etc.) to the inner coil. Thus, when the inner and outer coils are placed both coaxial and co-linear with one another, the net resulting B-field is a dipole magnetic field at right angles to the central axis of the two solenoid coils. CCT solenoids are particularly advantageous for the fabrication of high B-field HTS dipole magnets that are preferred for MHD operation. Further advantage can be realized when HTS cable-on-round-core (CORC) conductor is used for the fabrication of the HTS CCT dipole magnet. HTS CORC cable is advantageous because of its high mechanical flexibility and low AC loss, when compared to simple HTS tape configurations.

In some embodiments, the SC dipole magnets are configured in a so-called common coil arrangement. This dipole coil configuration is also sometimes referred to as a Helmholtz coil, in which the upper coil of the dipole magnet is powered in series with a current that is equal in magnitude but opposite in direction to the lower coil of the dipole magnet. For the purposes of this disclosure, the terms common coil and Helmholtz coil both have the same general meaning and are used interchangeably. One advantage of the common coil arrangement for the various embodiments described in this disclosure is that it enables the use of two separate axial ducts, and hence twice the thrust in a single dipole magnet arrangement.

In some embodiments, the SC magnets are configured in an internal, segmented toroidal arrangement. The internal, segmented toroidal arrangement is commonly used in a radial duct geometrical mounting configuration. These radial ducts can be disposed in propulsion pods that are mounted externally to the vessel. The size, footprint, B-field strength, shape, and number of segmented toroidal coils included in the radial duct is application-specific, and can be optimized based upon several factors including, but not limited to, B-field strength, B-field uniformity, stray B-field reduction, volume of fluid within the radial ducts, and drag. The SC magnets included in the segmented toroid can be wound in many geometrical shapes and configurations including, but not limited to, round coils, oval coils, racetrack coils, and D-shaped coils. An interesting geometrical shape of the SC coils is the D-shaped coil, due to its constant tension when energized.

In the internal, radial duct embodiments, the electrodes are placed on both the inner and outer radius of the duct. Similar to the axial duct, the higher the potential difference ($\Delta V$) between the two electrodes, the larger the $F_L$ and hence the larger the $F_{Th}$. The determination of the polarity (i.e. + or −) for the inner and outer radius of the duct is application-specific and can be changed (i.e. be reversed) as needed to develop either a forward or reverse $F_{Th}$. Likewise, the direction of $F_{th}$ can also be reversed by switching the polarity of the electrodes. There are many means that can be used to switch the polarity of the electrodes, including at least one of electrical means, mechanical means, chemical means, pneumatic means, and hydraulic means.

In some embodiments, the SC magnets operate in at least one of a persistent mode, a semi-persistent mode, and a continuous power mode. A persistent or semi-persistent mode is one in which the positive (+) and negative (−) terminals of the superconducting magnet are electrically shorted via a switch, and the power leads connecting to the room temperature external power source are disconnected (or at least partially disconnected) from the SC magnets. The switch that electrically shorts one terminal of the superconducting magnet to the other terminal is referred to as a persistent mode or semi-persistent mode switch. The distinction between a persistent mode switch and semi-persistent mode switch depends upon the electrical resistance (in ohms) of the switch. However, there is not a commonly accepted defining line of resistance between the two types of switches.

The advantage of operating the SC magnet in a persistent or semi-persistent power mode is that the heat leak to the cryogenic environment can be substantially reduced when compared to a continuous power mode, where the current leads remain permanently connected between the power source and the SC magnet. For the persistent or semi-persistent operational mode, this ability to electrically disconnect the SC magnet from its power source is advantageous when the MHD unit is cryogenically cooled with a cryogenic fluid from a passive TES system. The substantially lower heat leak enables longer term operation with the cryogenic fluid from the passive TES.

In some embodiments, the bushings or current leads that connect the room temperature power source to the SC magnets are formed of at least one of a normal current lead, an HTS current lead, a binary normal and HTS current lead, and an intelligent current lead (ICL).

In some embodiments, the cryogenic refrigeration system is formed of at least one active cryogenic refrigerator. In other embodiments, the cryogenic refrigeration system is a passive TES system that is formed using a cryogenic material. There are many cryogenic fluids that could be used for passive cooling, such as at least one of liquid helium (LHe), liquid or solid hydrogen, (LH2 or SH2), liquid or solid neon (LNe or SNe), liquid or solid nitrogen (LN2 or SN2), and liquid or solid methane (LCH4 or SCH4). In yet other embodiments, the cryogenic refrigeration system includes a two-part or hybrid system having at least one active cryocooler and at least one passive cryogenic TES system.

The terms cryogenic refrigerator, cryocooler, and active refrigeration system are used interchangeably throughout this disclosure, and generally have the same meaning. The terms TES material, cryogenic fluid, cryogenic liquid, cryogenic solid, isothermal phase change material, non-isothermal heat capacity material, refrigerant, and passive refrigeration system also tend to be used interchangeably throughout this disclosure, and generally have the same meaning. The term hybrid cryogenic refrigeration system refers to a system having at least one active cryogenic refrigerator and at least one passive TES.

In some embodiments, the electric field (E-field), positioned at right angles or mostly right angles to the B-field, is formed of at least one electrode, capacitor, supercapacitor, ultra-capacitor, parallel plate capacitor, dielectric capacitor, and electret. A common configuration is a cathode and anode pair in which an applied voltage (V) is placed across the pair of electrodes and a current density (J), flows between the anode and cathode pair.

The terms electrode, capacitor, ultra-capacitor, and electret generally have the same meaning and are used interchangeably throughout this disclosure. The term cathode refers to the positive polarity (+) of the electrode pair, and the term anode refers to the negative polarity (−) of the electrode pair. The shape, geometry, and material of the electrodes are all factors in the operation of the MHD. One common type of cathode material is platinum (Pt) and alloys thereof. There are many possible anode materials that could be used for the negative electrode.

In some embodiments, where the materials of the anode and cathode are different, an electrochemical potential between the electrodes can develop when placed in an electrically conducting medium such as seawater, independent of the application of an external electric field. This electrochemical potential has the added benefit of creating a small $F_L$ and hence a corresponding $F_{Th}$ without an external power source, thereby making the MHD more efficient. However, the presence of this electrochemical potential can also lead to galvanic corrosion, and rapidly degrade the electrodes, thus requiring frequent replacement of the electrodes.

Although a parallel plate electrode geometry is depicted in several of the figures used to describe the embodiments in this disclosure, it is understood that other shapes and geometries are possible, such as radial electrodes, and can be optimized, depending upon the overall constraints and requirements of the specific MHD. Likewise, although a round duct is depicted in the majority of the figures in this disclosure, it is understood that other shaped ducts are possible including, but not limited to, at least one of round, square, rectangular, hexagonal, multi-polygonal, oval, and racetrack.

Cryogenic Refrigeration System

The term "passive cooling" as used herein refers to any cooling system based upon a TES system that does not require any electrical power source located on the transportable apparatus to maintain the temperature of the cryogenic electrical device over a specified period of time (Δt). The amount of TES refrigerant carried on the transportable apparatus is sized for a predetermined temperature range (ΔT) and for a predetermined time period (Δt). The advantage of a passive cooling system for an MHD is that no electrical power or machinery is necessary to maintain the HTS magnet's temperature during the time in which the TES material or cryogenic fluid maintains the MHD's system temperature. By eliminating the use of an active cryocooler during this finite period of time (Δt), the acoustic signature of the MHD is reduced, and thus it provides a quieter, stealthier operation.

A disadvantage of an MHD that exclusively uses a passive cooling system is that the size and mass of the TES refrigerant required to maintain the cryogenic temperature of the MHD for a specified time may be prohibitively large for the transportable platform.

When a passive cooling system is insufficient, it may be advantageous to use an active cryogenic cooling system. The advantage of an active cooling system versus a passive cooling system is that no TES material or cryogenic fluid is required to maintain the MHD's cryogenic temperature. The only requirement for an active cooling systems is its input electrical power and a means for transferring the cooling power from the active cryogenic refrigerator to the MHD.

The means to transfer the heat between the MHD and the cryogenic refrigerator can be at least one of solid-state thermal conduction, gas or vapor convection, and radiation. For an MHD requiring quiet operation, a disadvantage of an active cooling system versus a passive cooling system is the accompanying noise associated with the cryogenic refrigerator's operation and the need for an electrical power source. An active cryogenic refrigerator requires a power source and increases the acoustic signature of the MHD and makes the overall MHD less stealthy.

In some embodiments, it is advantageous to use a two-part or hybrid cooling system that uses a synergistic combination of both a passive cooling system and an active cooling system. The advantage of a two-part or hybrid cooling system is that the passive cooling system can be employed when stealth operations are required, and the active cooling system can be used when non-stealth operations are required. In addition, when non-stealth operations are required, the active cooling system can be used to re-cool and replenish the TES cryogenic fluid needed by the passive cooling system.

The TES cryogenic fluid carried on the MHD can come in many forms and in some embodiments is comprised of at least one of an isothermal phase change material such as a cryogenic fluid (e.g. SH2/LH2, SNe/LNe, SN2, LN2, etc.). In other embodiments, the TES material is formed from at least one of a non-isothermal high heat capacity material. Examples of non-isothermal heat capacity materials include but are not limited to solid water-ice, hydrocarbons, salts, alkaline metals (Na, K, etc.), etc. MHDs cooled by high heat capacity TES materials operate using a so-called transient non-isothermal heat capacity (t-NIHC) operational approach. The t-NIHC operational principle is somewhat complex and requires further explanation regarding its practical implementation.

In some embodiments, in a t-NIHC system, the HTS device operates in a thermally transient, non-isothermal state in which the MHD is initially cooled (via its active cryocooler) to its starting temperature ($T_i$). After reaching its lowest temperature ($T_i$), the MHD, along with its high specific heat ($C_p$) refrigerant, is maintained at $T_i$ via the active cryocooler under normal operating conditions of the device. During interrupt conditions where power is lost to the active cryocooler (or shut down for temporary maintenance), the MHD and its high $C_p$ refrigerant are allowed to slowly warm to its final operating temperature ($T_f$) over a period of time.

For t-NIHC operation, the $T_f$ reached by the MHD is less than the so-called current sharing temperature ($T_{es}$) of the HTS material, where $T_f << T_{es}$. The current-sharing temperature of a superconductor is the critical transition temperature of the superconductor when it has been subjected to a magnetic field B and is carrying a transport current density (J). The time ($\Delta t_m$) it takes for the HTS device to warm from $T_i$ to $T_f$ will depend on the heat capacity of the high $C_p$ material, its mass (m), and $\Delta T = T_f - T_i$.

Superconducting (SC) Magnets

HTS magnets refer to any SC magnet with a critical transition temperature ($T_c$) higher than 39K. Some common types of HTS magnets include, but are not limited to, ReBaCuO, YBaCuO, BiPbSrCaCuO, and TlBaCaCuO. HTS magnets have several advantages over LTS magnets for MHD operation including, but not limited to, higher B-field strength, higher heat capacity (and hence less susceptible to quench), higher operating temperatures (easing cryogenic refrigeration size), reduced mass, reduced cost, and reduced complexity.

For the embodiments described in this disclosure, LTS magnets refer to any superconducting magnet with a critical transition temperature ($T_c$) lower than 39K. Some common types of LTS magnets include, but are not limited to, Mg—B, Nb—Sn, (NbTi)—Sn, (NbTa)—Sn, Nb—Al, NbTi, and Nb. One advantage of LTS magnets over HTS magnets is that the LTS wire comprising the magnets tends to be of a lower cost than the HTS wire. There are several disadvantages of LTS magnets versus HTS magnets including, but not limited to, lower B-field strength, lower quench energy, and the requirement of a larger and more complex refrigeration system.

A hybrid magnet refers to any superconducting magnet having at least one of an HTS magnet and at least one of an LTS magnet. In a hybrid superconducting magnet, the HTS magnet is inserted within the inner bore of the LTS magnet. The LTS magnet is sometimes referred to as the outsert coil and the HTS magnet as the insert coil. In this manner, the net B-field of the LTS outsert and HTS insert is the vector sum of the two B-fields. The hybrid HTS and LTS magnet can be connected in series and powered from a single power source, or can be powered in parallel, or separately by two or more power sources. An advantage of a combined hybrid LTS and HTS magnet is that higher B-fields can be generated than either an individual HTS or LTS magnet.

Thrust

Without being bound by theory, a discussion of the mechanism of MHD is next provided for clarity. For the embodiments described in this disclosure, the magnetic field (B-field) is generally spatially located with at least one of its vector components at right angles or nearly right angles to the electric field (E-field) to generate a Lorentz force ($F_L$). In general, the $F_L$ created by an MHD is given by:

$$F_L = J_{electrode} * B * \mathrm{Sin}(\theta), \quad [1]$$

where $J_{electrode}$ is the electrode current density in A/m$^2$, B is the magnetic field in Tesla, and θ is the angle between $J_{electrode}$ and B. The thrust is maximized when $J_{electrode}$ and B are at right angles (90°) to one another and minimized when the $J_{electrode}$ and B are parallel (0°) to one another. From Ohms law, the current density $J_{electrode}$ is equal to:

$$J_{electrode} = \sigma E, \quad [2]$$

where σ is the electrical conductivity in Siemens and E is the electric field in V/m across the electrodes. For a one dimensional (1-d) static electric field, the E-field can be calculated from the gradient of a potential scalar field equal to:

$$E = -dV_{electrode}/dx = -V/d, \quad [3]$$

where $dV_{electrode}$ is the voltage across the electrodes in V, and d is the distance in m between the electrodes. Thus, the thrust is increased by either increasing the B-field or voltage between the plates. The voltage between the electrode plates cannot be increased arbitrarily large, or else the propulsion system will lose efficiency, the sea water medium may begin to hydrolyze and degrade the electrodes, as well as create a detectable bubble trail.

The net propulsive thrust ($F_{Th}$) depends upon several factors in an MHD including, but not limited to, $F_L$ per duct given by Eq. [1], number of ducts, mass flow (m-dot) of conductive medium, volume of fluid (V), electrical conductivity of medium (σ), coefficient of hydrodynamic drag within the duct, shape of the duct, etc.

Magnet Configuration

There are many SC magnet configurations that could be used to form the MHD as described in this disclosure. In some embodiments, the B-field is formed from at least one dipole magnet. The dipole magnet configuration is generally used in linear/axial concepts with externally mounted pods or internal mounts. There are dipole magnet configurations with advantages and disadvantages for each configuration. Dipole magnet configurations that limit the external magnetic signature or fringe B-field are particularly advantageous in some applications.

In some embodiments, the B-field is from at least one or more toroid magnets. Toroids are generally used in radial concepts mounted external to the ship's hull. A segmented toroid is particularly advantageous for the embodiments described in this disclosure, when applied to an annular mounting external to the ship's hull. The segmented toroid has a low external magnetic signature, is relatively straightforward to fabricate, and the built-in segments allow room for channels that permit the passage of the conductive medium to flow and hence create the desired thrust and propulsion.

Persistent or Semi-Persistent Mode Operation

The extremely low electrical resistance of superconductors enables superconducting magnets to operate in a so-called persistent mode (PM) or semi-persistent mode (SPM). PM or SPM operation is one in which the terminals of the HTS or LTS magnet are electrically shorted together and the power leads connecting the room temperature power source to the superconducting device are physically disconnected. Due to the near zero resistance of the superconductor and the PM or SPM switch, the current flowing in the SC magnet continues to flow even though the power source has been completely disconnected, The advantage of PM or SPM operation for the embodiments described in this disclosure is that the heat load from the room temperature power source to the cryogenic refrigeration system can be reduced. Reducing the heat load to the cryogenic refrigerator has many practical advantages including, but not limited to, reduced electrical power consumption, and reduced boil-off or melting of the TES material. The terms PM and SPM tend to be used interchangeably throughout this disclosure, and generally have the same meaning.

In some embodiments, the SC magnets occasionally operate in at least one of a PM and an SPM, while at other times the SC magnets operate in a continually-powered mode.

Modes of Operation

In some embodiments, a maximum forward thrust ($F_{th}$) of the MHD is developed when a B-field vector is positioned at right angles (θ=90°) to the electrode current density ($J_{electrode}$). In addition, a thrust in the opposite direction (i.e. reverse thrust, $-F_{th}$) can also be achieved by the embodiments described in this disclosure. The direction of the thrust can be reversed by using at least one of an electrical means and a mechanical means. Changing the direction of the thrust using an electrical means can be achieved by at least one of changing the direction of the current flowing ($I_{magnet}$) in the SC magnet, and changing the direction (i.e. polarity) of the electrode current density ($J_{electrode}$). To change the direction of current flow in either the SC magnet or electrodes, the polarity of the current leads can be switched in either the SC magnet or the electrodes using at least one of an electrical switch and a mechanical switch.

In other embodiments, the thrust magnitude and direction can be either varied or completely reversed by mechanical means. From Eq. [1], it can be seen that by mechanically rotating either the SC magnet polarity or the electrodes by an angle θ, the $F_L$ can be varied from its maximum value when θ=90° to its minimum value when θ=0°. Thus, thrust can be completely reversed by mechanical rotation of about 180° of at least one of the duct housing the electrodes (resulting in a change in the direction of $J_{electrode}$), and the SC magnet. This embodiment can be advantageous as compared to using electrical means to swap the direction of current flow in the SC magnet, because it reduces the AC loss dissipated in the cryogenic environment that is cooling the SC magnet.

In yet another embodiment, a unidirectional forward thrust (or similarly a unidirectional reverse thrust) can be achieved by simultaneously switching the polarities of both the SC magnet and the electrode current at the same time. The simultaneous switching of both the electrode polarity and the SC magnet polarity can be achieved via at least one of electrical means and mechanical means. This embodiment is useful for certain types of electrodes that require periodic recharging (i.e. charge reversal) to maintain a high output current density ($J_{electrode}$).

In some embodiments, the magnitude of the thrust ($F_{Th}$) is varied with the strength of the B-field. The strength of the B-field can be adjusted by at least one of mechanical means and electrical means. The B-field strength (and hence $F_{th}$) can be varied using electrical means by varying the current (I) in the SC magnet. For Eq. [1]. The magnitude of the thrust can also be varied via mechanical means (e.g. using a motor) by rotating the B-field with respect to the E-field between the electrodes. Thus, when the B-field is perpendicular (i.e. θ=90°) to the E-field the thrust is at a maximum. When the B-field is parallel (i.e. θ=180°), the thrust is zero.

In another embodiment, the magnitude of the thrust is varied by changing the voltage across the electrodes. The strength of the E-field between the electrodes can be adjusted by at least one of mechanical means and electrical means.

In still another embodiment, the thrust is varied by a combination of varying both the B-field strength in the SC magnet and the E-field strength across the electrodes.

DEPICTED EMBODIMENTS

With reference now to the drawings, there are depicted all of the claimed elements of the various embodiments, although all claimed embodiments might not be depicted in a single drawing. Thus, it is appreciated that not all embodiments include all of the elements as depicted, and that some embodiments include different combinations of the depicted elements. It is further appreciated that the various elements can all have many different configurations and are not limited to just the configuration of a given element as depicted. As indicated above, the elements of the drawings as depicted are not to scale, even with respect one to another, and relative size or thickness of one element cannot be determined by reference to any dimension of another element.

FIG. 1 depicts an internal MHD embodiment including a racetrack SC dipole magnet 110, a pair of electrodes 120, further comprising a cathode (+) 121 and an anode (−) 122, an electrically conducting medium 130, and an axial duct 140, which as described above, is an MHD. The cryostat or vacuum vessel 150 surrounds the racetrack SC dipole magnet 110 and thermally isolates the racetrack SC dipole magnet 110 from its surroundings. The axial duct 140 has an intake 160 where the electrically conducting medium 130 enters and an exhaust 170 where the medium 130 exits. When a voltage difference (ΔV) is placed across the pair of electrodes 120 by an external power source and a current 190 flows in the racetrack SC dipole magnet 110 to create a B-field 200, and a net thrust ($F_{Th}$) 185 is generated.

Figure 2:
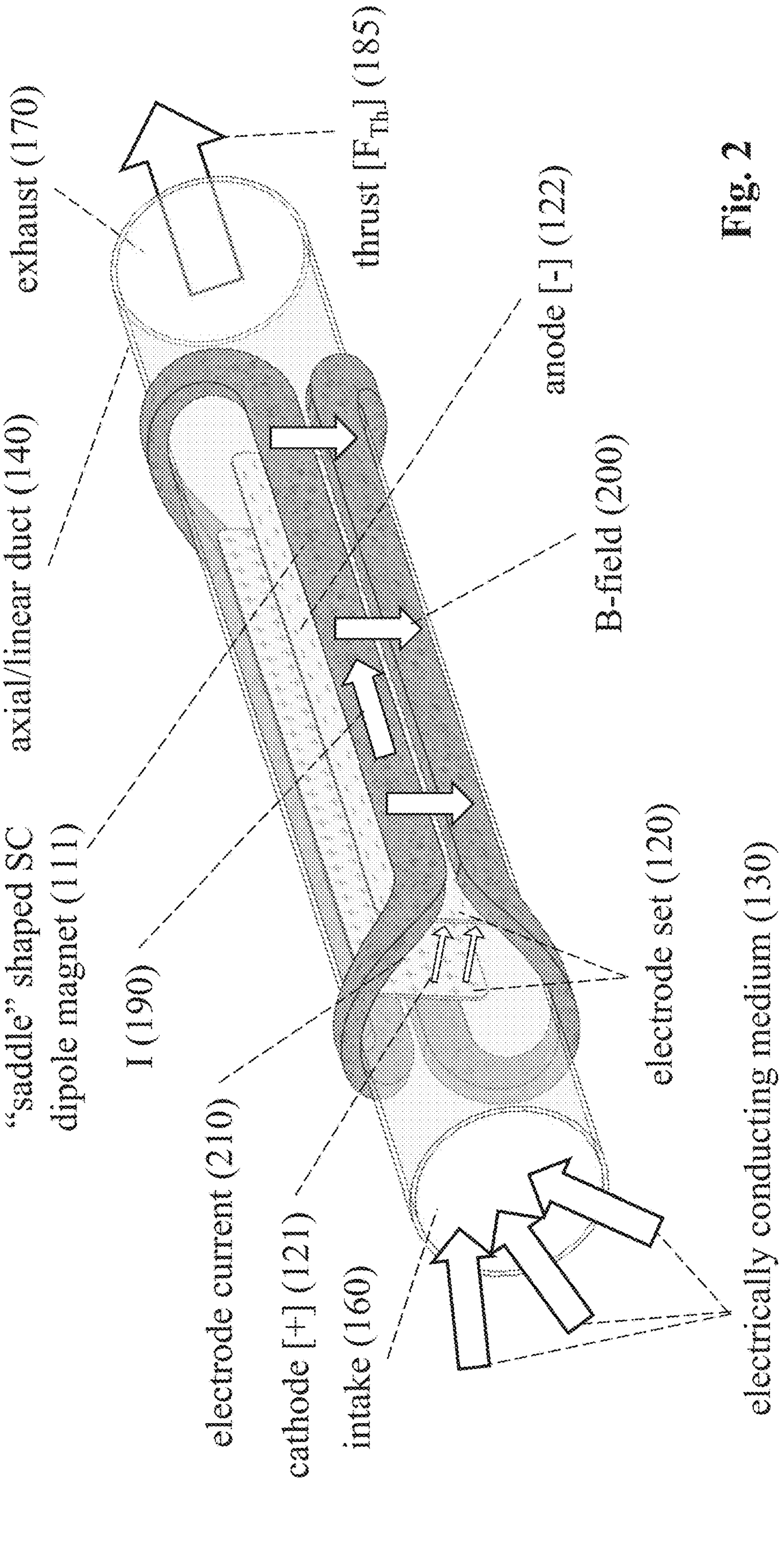
FIG. 2 is an internal depiction of an MHD using an axial duct for its geometrical mounting configuration, with a saddle dipole SC magnet and parallel plate electrodes located in the bore of the saddle dipole SC magnet, according to an embodiment of the present disclosure.

FIG. 2 depicts an internal MHD embodiment including a saddle-shaped SC dipole magnet 111, a pair of electrodes 120, including a cathode (+) 121 and anode (−) 122, an electrically conducting medium 130, and an axial duct 140, which as described above, is an MHD. The cryostat or vacuum vessel surrounds the saddle shaped SC dipole magnet 111 and thermally isolates the saddle shaped SC dipole magnet 111 from its surroundings. The axial duct 140 has an intake 160 where the electrically conducting medium 130 enters and an exhaust 170 where the medium 130 exits. When a voltage (ΔV) is placed across the pair of electrodes 120 by a power source, and a current (I) 190 flows in the saddle SC dipole magnet 111 to create a B-field 200, and a net thrust ($F_{Th}$) 185 is generated.

Figure 3:
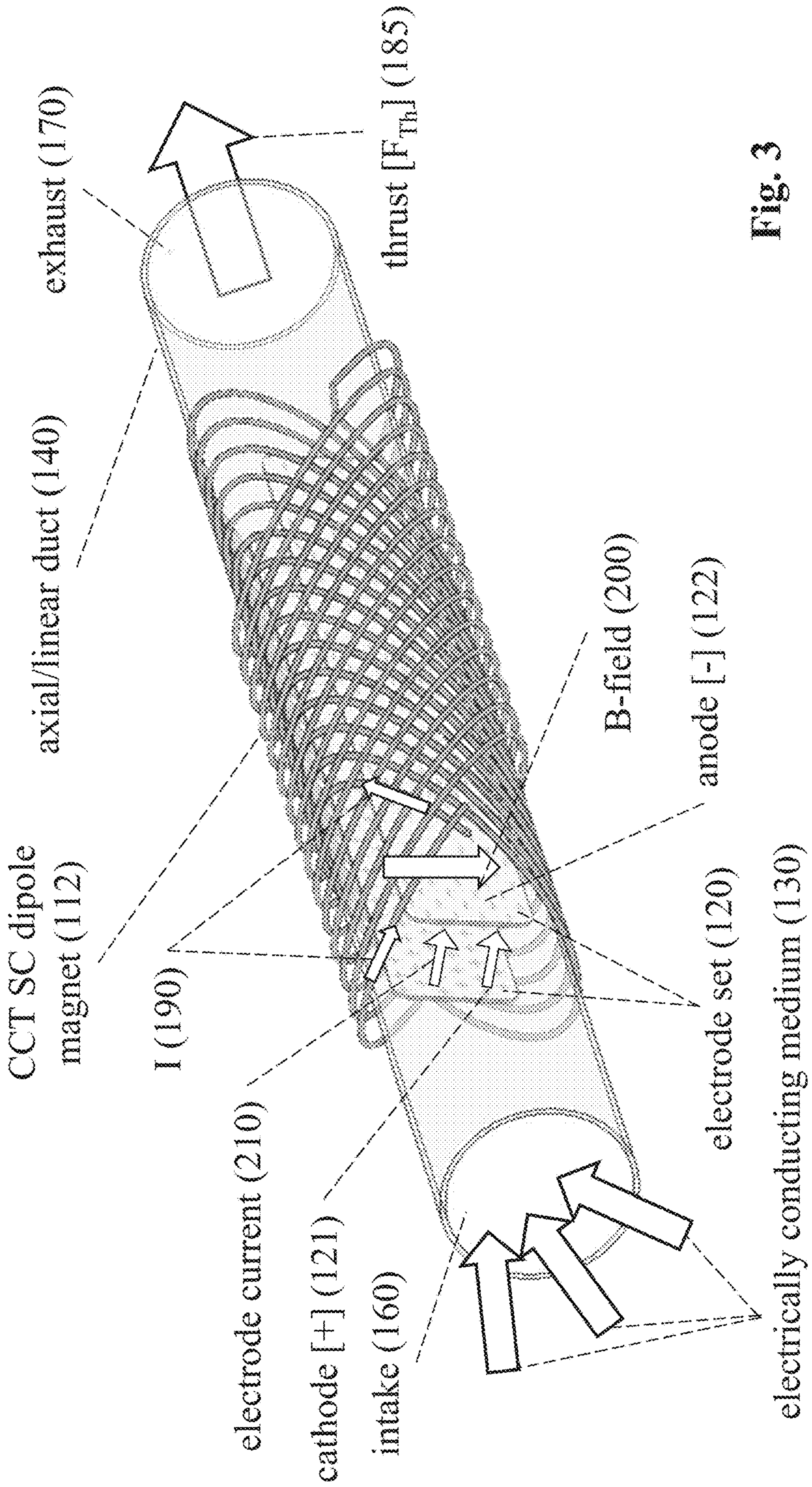
FIG. 3 is an internal depiction of an MHD using an axial duct for its geometrical mounting configuration with a canted cosine theta (CCT) dipole SC magnet and parallel plate electrodes located in the bore of the CCT dipole SC magnet, according to an embodiment of the present disclosure.

FIG. 3 depicts an internal MHD embodiment, including a CCT SC dipole magnet 112, a pair of electrodes 120, including a cathode (+) 121 and anode (−) 122, an electrically conducting medium 130, and an axial duct 140, which as described above, is an MHD. The cryostat or vacuum vessel surrounds the CCT SC dipole magnet 112 and thermally isolates it from its surroundings. The axial duct 140 has an intake 160 where the electrically conducting medium 130 enters and an exhaust 170 where the medium 130 exits. When a voltage (ΔV) is placed across the pair of electrodes 120 by a power source, and a current (I) 190 flows in the CCT SC dipole magnet 112 to create a B-field 200, and a net thrust ($F_{Th}$) 185 is generated.

Figure 4:
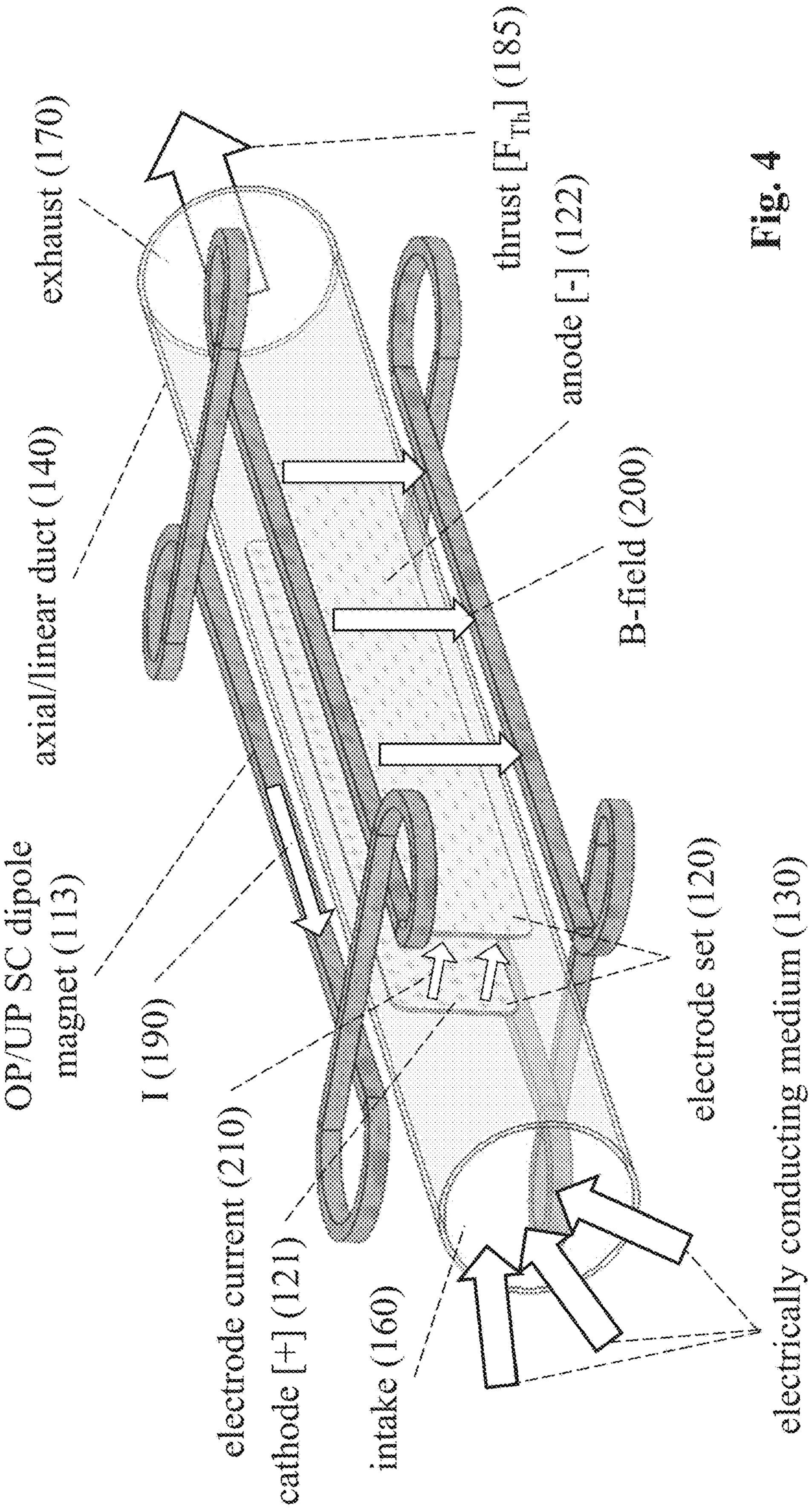
FIG. 4 is an internal depiction of an MHD using an axial duct for its geometrical mounting configuration, with an overpass/underpass (OP/UP) dipole SC magnet and parallel plate electrodes located in the bore of the OP/UP dipole SC magnet, according to an embodiment of the present disclosure.

FIG. 4 depicts an internal MHD embodiment, including an OP/UP SC dipole magnet 113, a pair of electrodes 120, including a cathode (+) 121 and anode (−) 122, an electrically conducting medium 130, and an axial duct 140, which as described above, is an MHD. The cryostat or vacuum vessel surrounds the OP/UP SC dipole magnet 113 and thermally isolates it from its surroundings. The axial duct 140 has an intake (160) where the electrically conducting medium 130 enters and an exhaust 170 where the medium 130 exits. When a voltage (ΔV) is placed across the pair of electrodes 120 by a power source, and a current (I) 190 flows in the OP/UP SC dipole magnet 113 to create a B-field 200, and a net thrust ($F_{Th}$) 185 is generated.

Figure 5B:
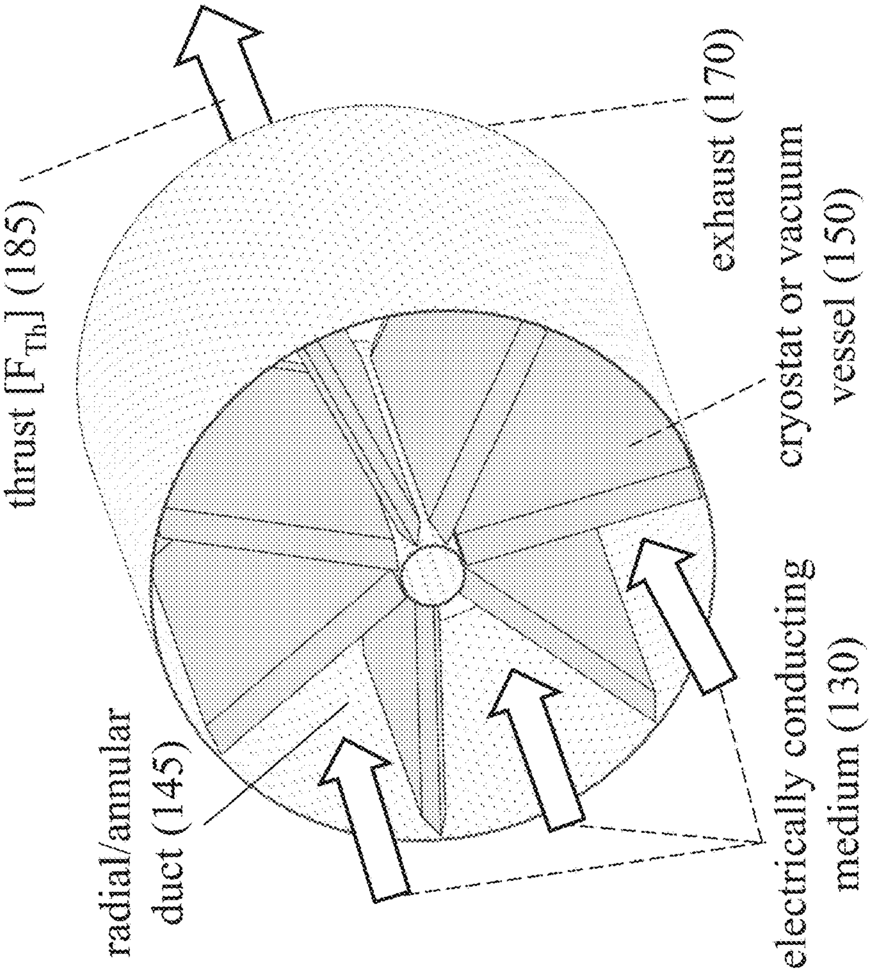
FIG. 5B is an internal depiction of an MHD using a radial duct for its geometrical mounting configuration, with seven radial ducts and a cryostat surrounding the segmented D-shaped toroidal SC magnets, and electrodes configured on the inner and outer diameters, according to an embodiment of the present disclosure.
Figure 5A:
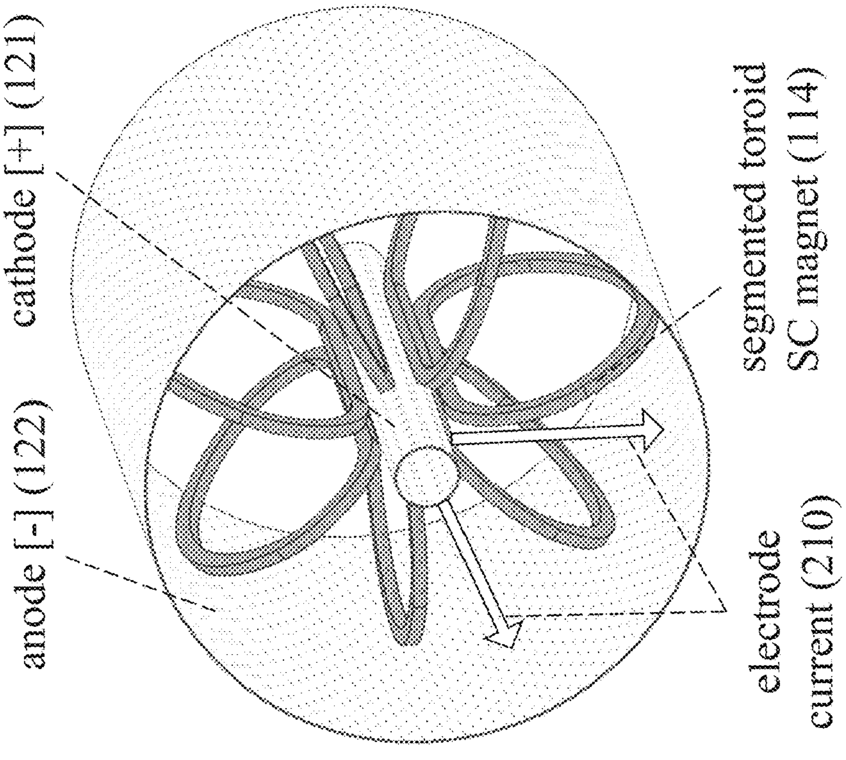
FIG. 5A is an internal depiction of an MHD using a radial duct for its geometrical mounting configuration, with seven segmented, D-shaped, toroidal SC magnets and electrodes configured on the inner and outer diameters, according to an embodiment of the present disclosure.

FIG. 5A depicts an internal MHD embodiment with a radial duct 145, including a segmented D-shaped toroid SC magnet 114, a pair of electrodes 120, including a cathode (+) 121 on the inner radius and an anode (−) 122 on the outer radius. An electrically conducting medium 130 flows from the cathode 121 to the anode 122 creating an electrode current 210.

FIG. 5B depicts an isometric view of an internal MHD embodiment having a radial duct 145, a segmented D-shaped toroid SC magnet 114, a pair of electrodes, an electrical conducting medium 130, which as described above, is an MHD. The cryostat or vacuum vessel 150 surrounds the segmented D-shaped toroid SC magnet 114 and thermally isolates it from its surroundings. The radial duct 145 has an intake 160 where the electrically conducting medium 130 enters and an exhaust 170 where the medium 130 exits. When a voltage (ΔV) is placed across the pair of electrodes 120 by an external power source 180 in the presence of a B-field, a net thrust ($F_{Th}$) 185 is generated. The polarity of the electrodes 120 can be reversed so that the cathode (+) 121 is on the outer radius and the anode (−) 121 in on the inner radius to reverse the direction of the thrust ($F_{Th}$) 185.

Figure 5C:
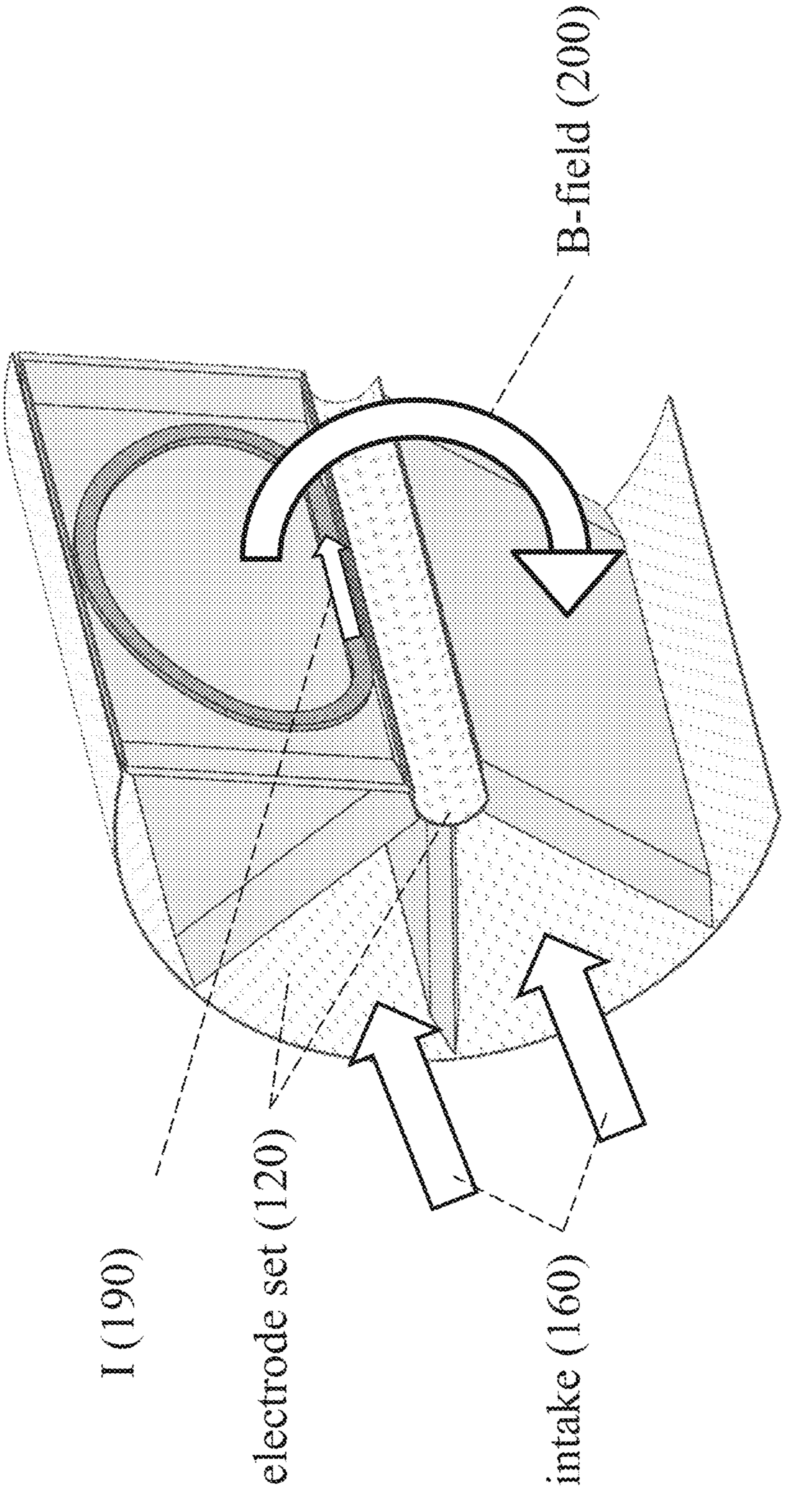
FIG. 5C is a cross-sectional view of an internal depiction of an MHD using a radial duct for its geometrical mounting configuration, with segmented, D-shaped, toroidal SC magnets and electrodes configured on the inner and outer diameters, according to an embodiment of the present disclosure.

FIG. 5C depicts a cross-sectional view of an internal MHD embodiment having a radial duct 145, a segmented D-shaped toroid SC magnet 114, a pair of electrodes 120, an electrical conducting medium 130, which as described above, is an MHD. The cryostat or vacuum vessel 150 surrounds the segmented D-shaped toroid SC magnet 114 and thermally isolates it from its surroundings. The radial duct 145 has an intake 160 where the electrically conducting medium 130 enters and an exhaust 170 where the medium 130 exits. When a voltage (ΔV) is placed across the pair of electrodes 120 by an external power source and a current (I) 190 flows in the segmented D-shaped SC toroid magnet 114 to create a B-field, and a net thrust ($F_{Th}$) 185 is generated.

Figure 6A:
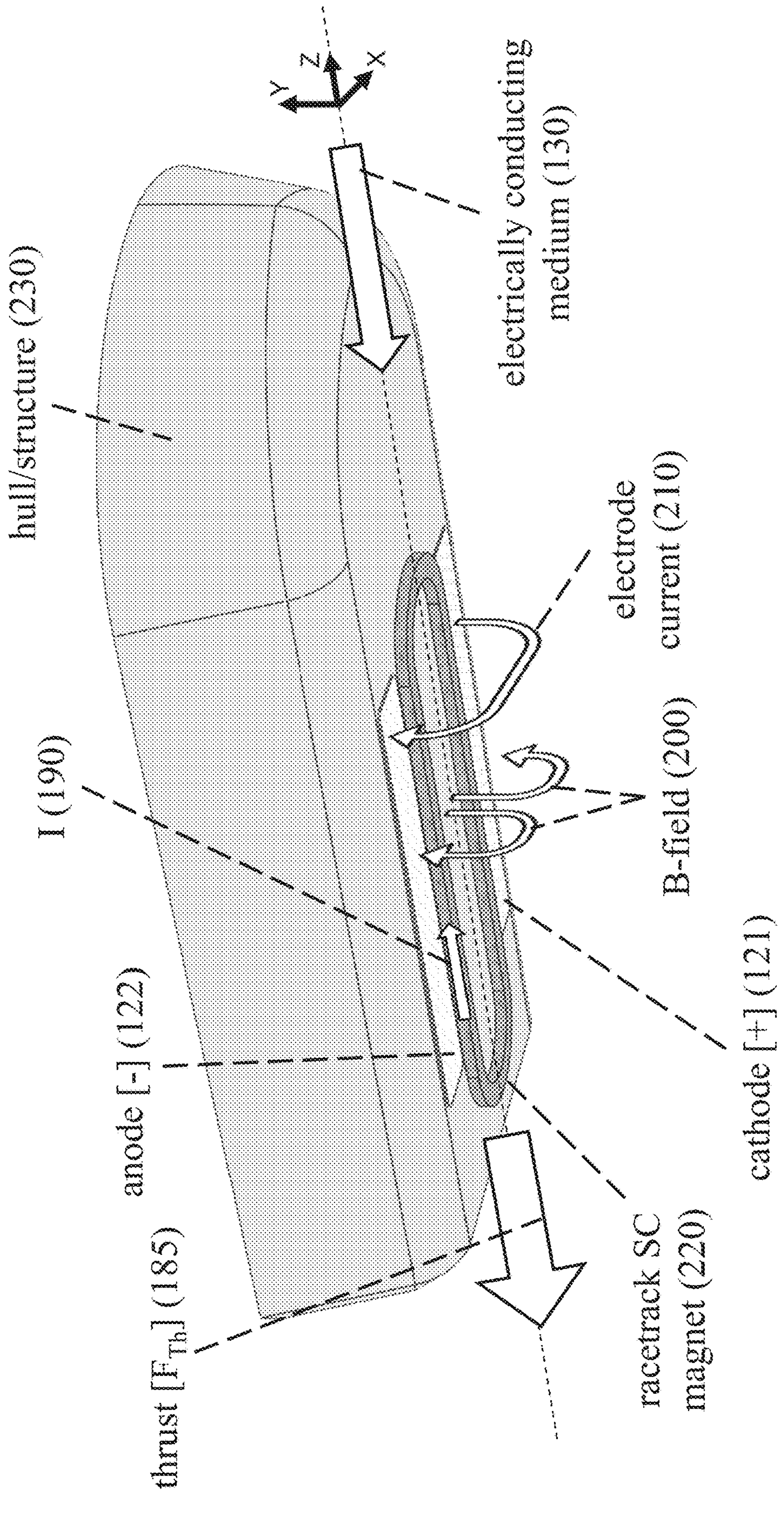
FIG. 6A is an isometrical view of an external depiction of an MHD using a ductless design for its geometrical mounting configuration, with a single racetrack SC magnet and a set of electrodes, including at least one of a cathode (+) and anode (−), according to an embodiment of the present disclosure.

FIG. 6A depicts an external MHD embodiment 106, comprising a ductless configuration, including a single racetrack SC magnet 220, an electrode pair 120, including a cathode (+) 121 and an anode (−) 122, an electrically conducting medium 130 surrounds the vessel's hull 230, which as described above is an MHD. A cryostat or vacuum vessel 150 surrounds the single racetrack SC magnet 220 and thermally isolates it from its surroundings. When a voltage (ΔV) is placed across the cathode 121 and anode 122 by an external power source, an electrode current 210 is created and a current (I) 190 flows in the single racetrack SC magnet 220 to create a B-field, and a net thrust ($F_{Th}$) 185 is generated.

Figure 6B:
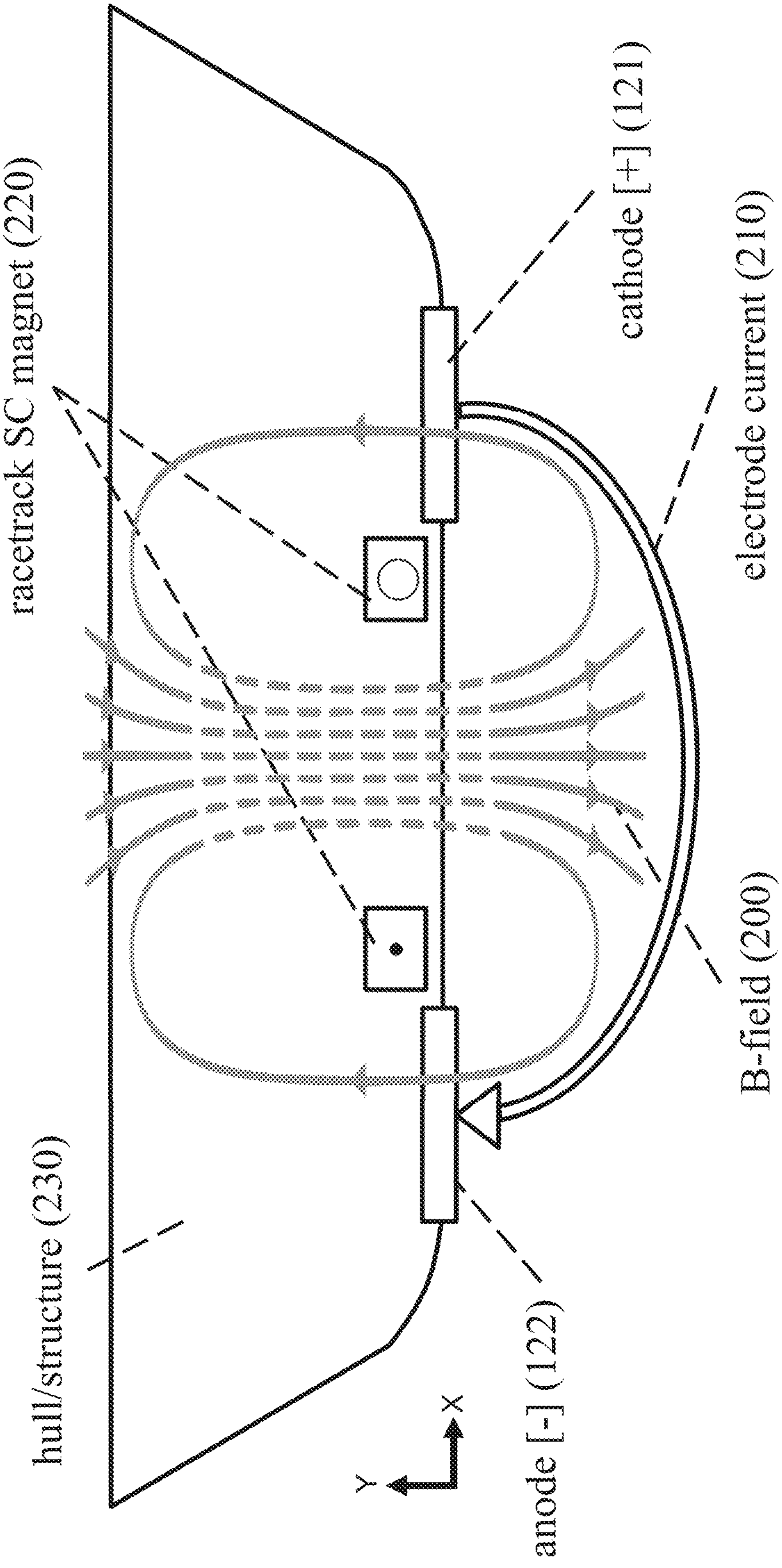
FIG. 6B is a cross-sectional view of an external depiction of an MHD using a ductless design for its geometrical mounting configuration, with a single race track SC magnet and a set of electrodes, including at least one of a cathode (+) and anode (−), according to an embodiment of the present disclosure.

FIG. 6B depicts a cross-sectional view of an external MHD embodiment having a ductless configuration, including a single racetrack SC magnet 220, an electrode pair 120, including a cathode (+) 121 and an anode (−) 122, an electrically conducting medium 130 surrounds the vessel's hull 230, which as described above is an MHD. A cryostat or vacuum vessel 150 surrounds the single racetrack SC magnet 220 and thermally isolates it from its surroundings. When a voltage (ΔV) is placed across the cathode 121 and anode 122 by an external power source, an electrode current 210 is created and a current (I) 190 flows in the single racetrack SC magnet 220 to create a B-field, and a net thrust ($F_{Th}$) 185 is generated.

Figure 7:
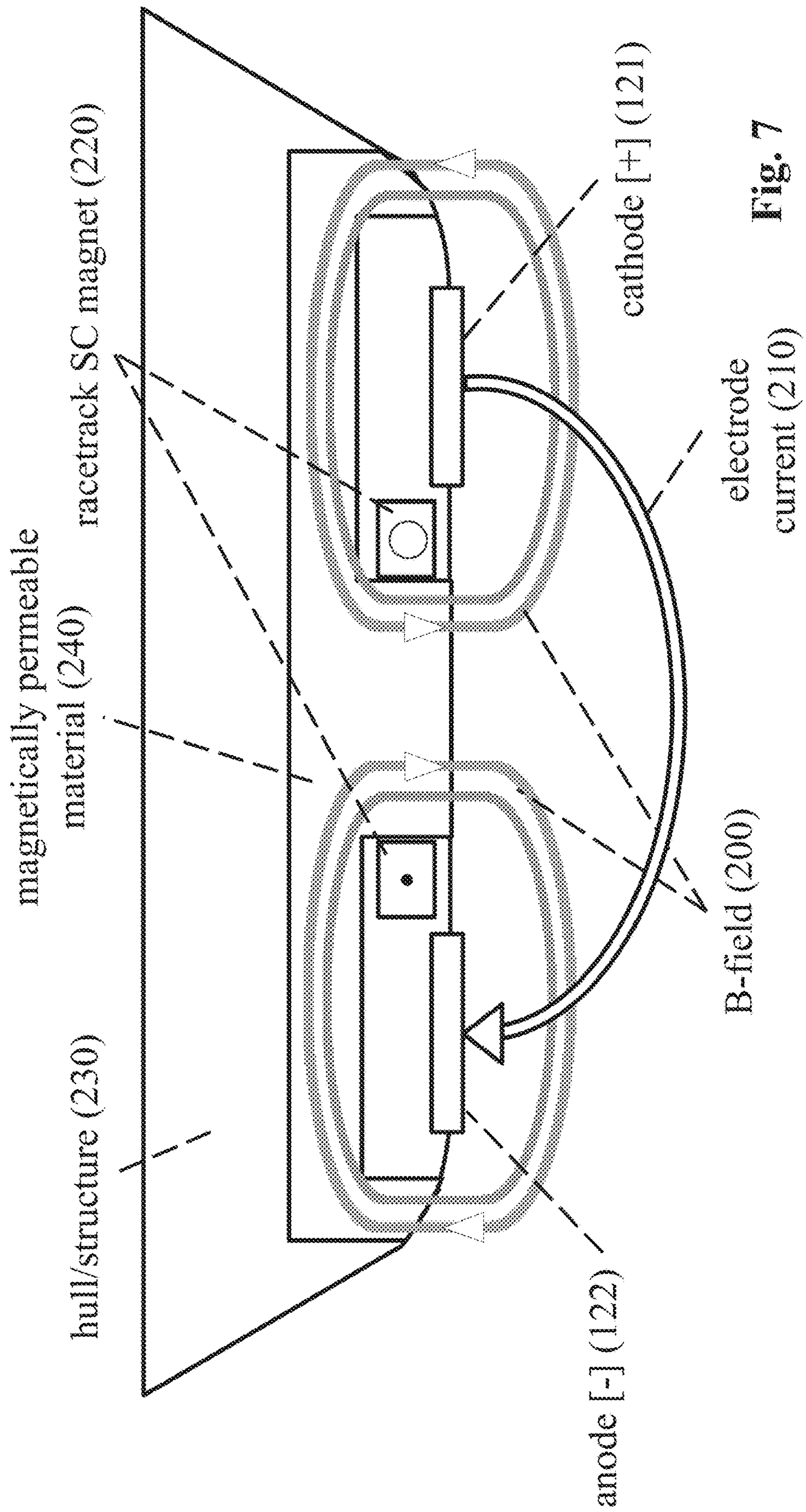
FIG. 7 is a cross-sectional view of an external depiction of an MHD using a ductless design for its geometrical configuration, with a single racetrack SC magnet and magnetic permeable material to shape the B-field and reduce the magnetic signature emanating from the SC magnet, according to an embodiment of the present disclosure.

FIG. 7 depicts a cross-sectional view of an external MHD embodiment having a ductless configuration, including a single racetrack SC magnet 220, an electrode pair 120, including a cathode (+) 121 and an anode (−) 122, an electrically conducting medium 130 surrounds the vessel's hull 230, and a magnetic permeable material 240, which as described above is an MHD. The magnetic permeable material 240 shapes the B-field generated by the single racetrack SC magnet 220. A cryostat or vacuum vessel 150 surrounds the single racetrack SC magnet 220 and thermally isolates it from its surroundings. When a voltage (ΔV) is placed across the cathode 121 and anode 122 by an external power source an electrode current 210 is created and a current (I) 190 flows in the single racetrack SC magnet 220 to create a B-field, and a net thrust ($F_{Th}$) 185 is generated.

Figure 8:
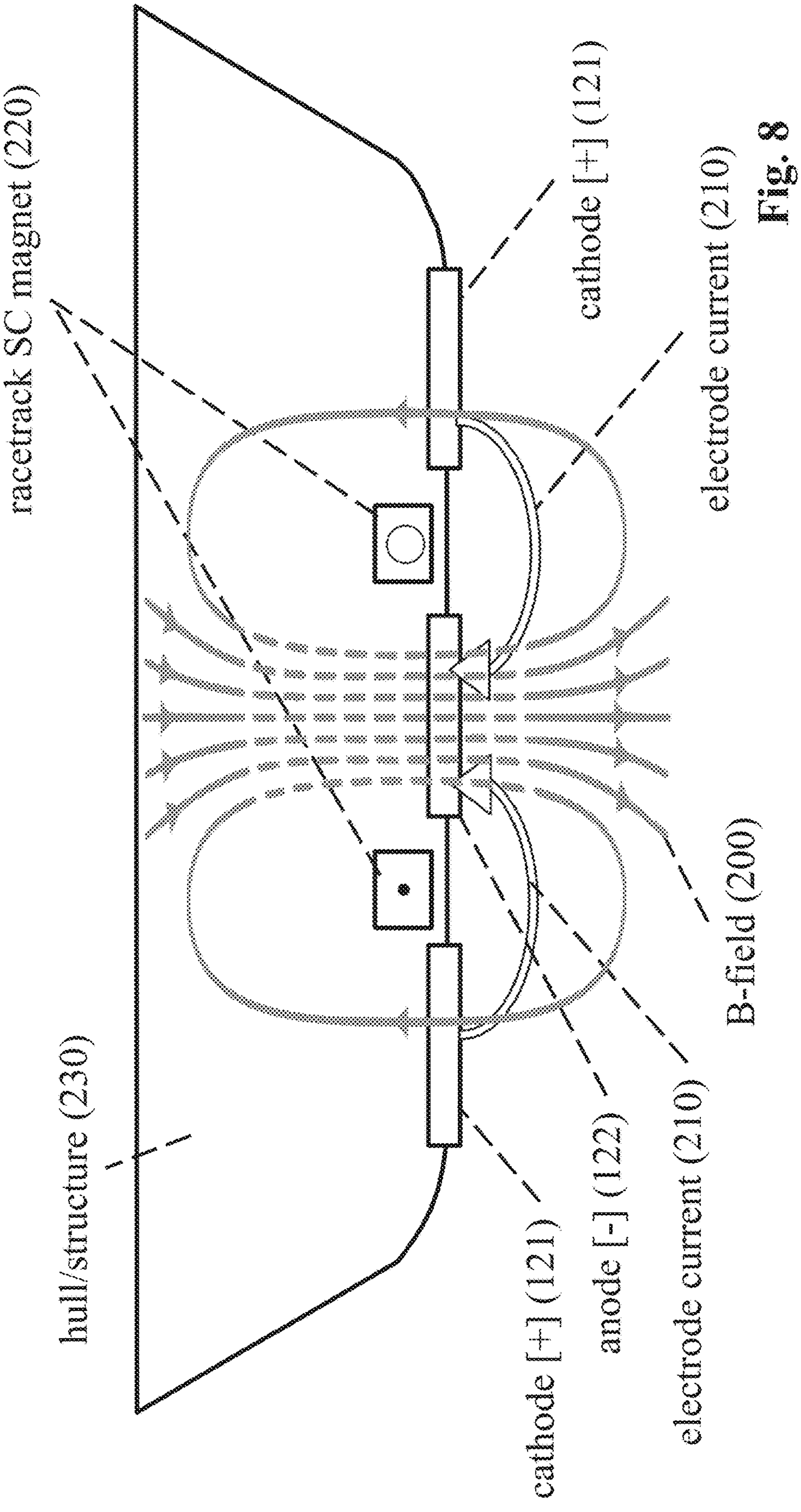
FIG. 8 is a cross-sectional view of an external depiction of an MHD using a ductless design for its geometrical configuration, with a single SC magnet, and two sets of cathodes (+) surrounding an anode (−), according to an embodiment of the present disclosure.

FIG. 8 depicts a cross-sectional view of an external MHD embodiment having a ductless configuration, including a single racetrack SC magnet 220, an electrode pair 120, including a first cathode (+) 121, a second cathode 123, and an anode (−) 122, an electrically conducting medium 130 surrounds the vessel's hull 230, which as described above is an MHD. A cryostat or vacuum vessel 150 surrounds the single racetrack SC magnet 220 and thermally isolates it from its surroundings. When a voltage (ΔV) is placed across the cathode 121 and anode 122 by an external power source an electrode current 210 is created and a current (I) 190 flows in the single racetrack SC magnet 220 to create a B-field, and a net thrust ($F_{Th}$) 185 is generated.

Figure 9:
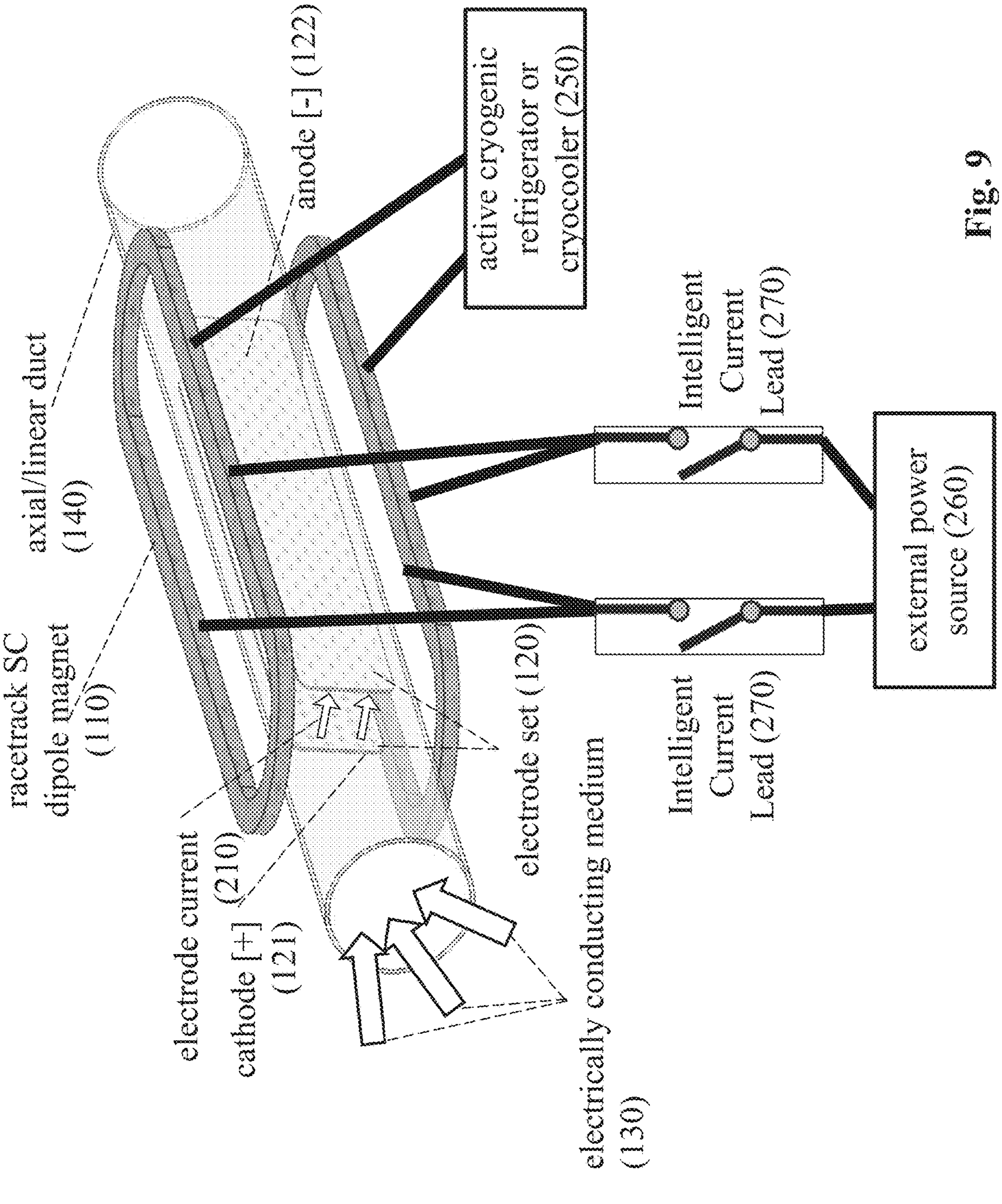
FIG. 9 is an internal depiction of an MHD using an axial duct for its geometrical mounting configuration, including an active cryocooler, and an external power source, according to an embodiment of the present disclosure.

FIG. 9 depicts an axial duct embodiment, including a racetrack SC dipole magnet 110, a pair of electrodes 120, including a cathode (+) 121 and anode (−) 122, an electrically conducting medium 130, an axial duct 140, an active cryogenic refrigerator or cryocooler 250, an external power source located at room temperature 260, and an intelligent current lead 270, which as described above, is an MHD. The racetrack SC dipole magnet 110 is electrically powered by the external power source 260, which is typically different than the external power source that supplies the voltage (V) across the pair of electrodes 120. Intelligent current leads 270 connect the power source 260 to the racetrack SC dipole magnet 110. In this embodiment, the power source 260 continuously powers the racetrack SC dipole magnet 110. Similarly, the active cryocooler 250 is configured to continuously cool the racetrack SC dipole magnet 110.

Figure 10:
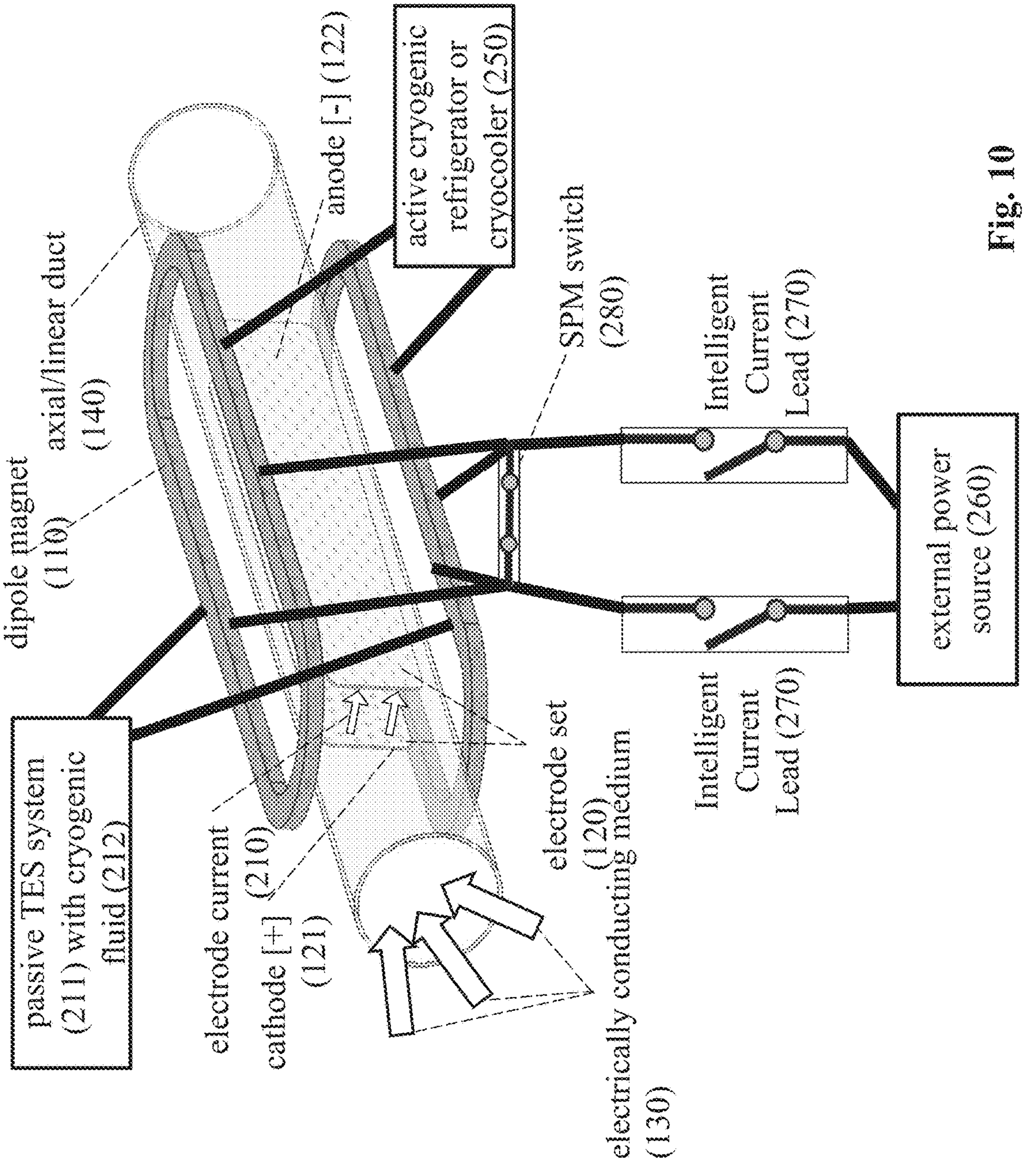
FIG. 10 is an internal depiction of an MHD using an axial duct for its geometrical mounting configuration, including a combination of both an active cryocooler and a passive TES with a cryogenic fluid, combined with a semi-persistent mode (SPM) switch and an intelligent current lead, where the SC dipole magnet is disconnected from the external power source, and the terminals are electrical shorted together, according to an embodiment of the present disclosure.

FIG. 10 depicts an axial duct embodiment, including a racetrack SC dipole magnet 110, a pair of electrodes 120, including a cathode (+) 121 and anode (−) 122, an electrically conducting medium 130, an axial duct 140, an active cryogenic refrigerator or cryocooler 250, a passive TES system 211 with a cryogenic fluid 212, an external power source located at room temperature 260, an intelligent current lead 270, and a semi-persistent mode (SPM) switch 280, which as described above, is an MHD. The racetrack SC dipole magnet 110 is electrically powered by the external power source 260, which is typically different than the external power source that supplies the voltage (V) across the pair of electrodes 120. Intelligent current leads 270 can either connect or disconnect the power source 260 to the racetrack SC dipole magnet 110.

FIG. 10 is a schematic illustrating when the power source 260 is electrically disconnected from the racetrack SC dipole magnet 110 via the intelligent current lead 270 and the positive (+) and negative (−) terminals are shorted together via an SPM switch 280. When the intelligent current lead 270 is disconnected from the racetrack SC dipole magnet 110, it reduces the heat load that flows into the cryostat, thereby preserving the cryogenic fluid 212. In this embodiment, both the active cryocooler 250 and the passive TES 211 with its cryogenic fluid 212 are configured to cool the racetrack SC dipole magnet 110.

Figure 11:
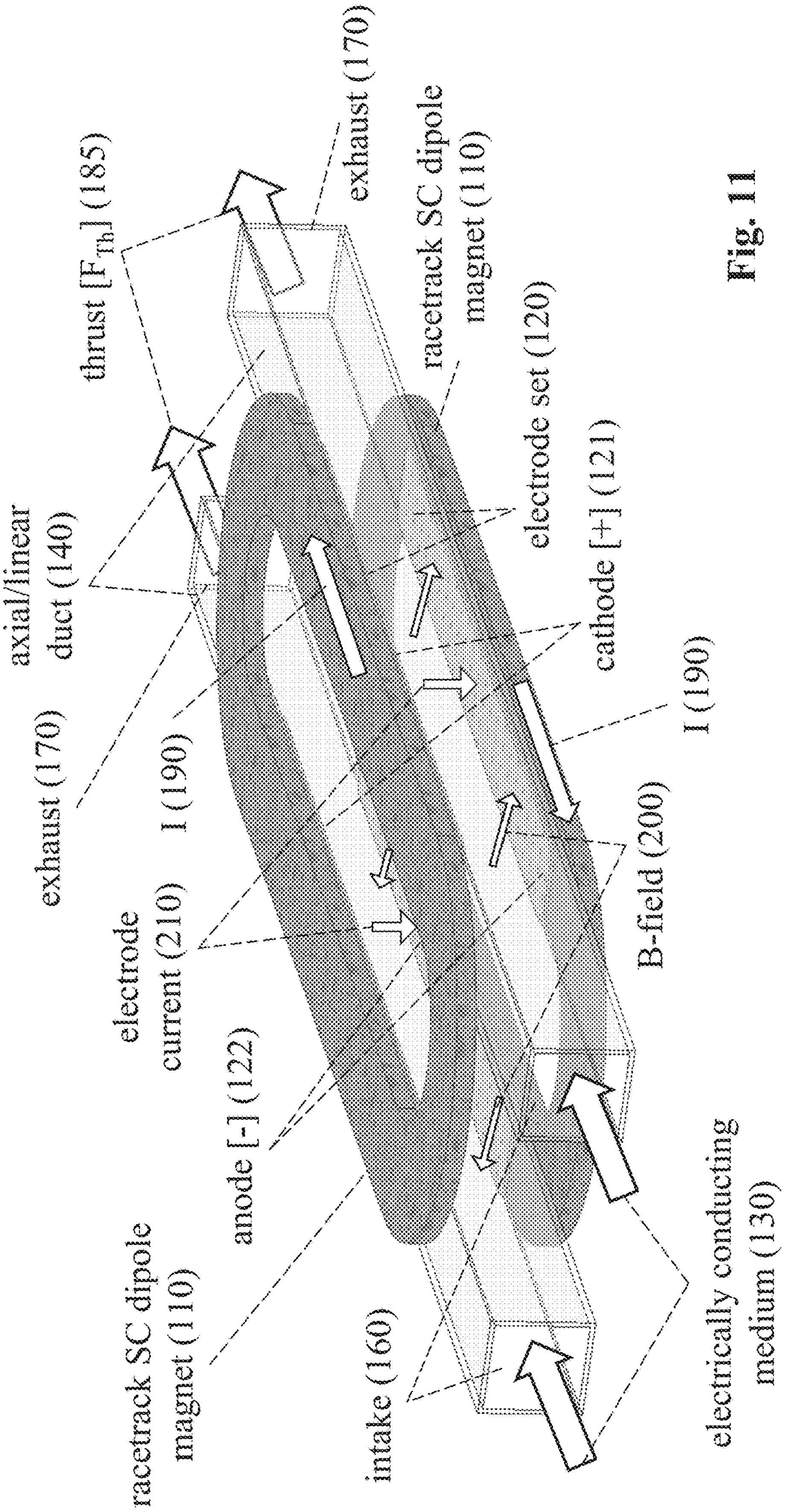
FIG. 11 is an internal depiction of an MHD using twin axial ducts for its geometrical mounting configuration, with a racetrack dipole SC magnet powered in a common coil configuration and two sets of parallel plate electrodes located in both ducts of the dipole SC magnet, according to an embodiment of the present disclosure.

FIG. 11 depicts an internal MHD embodiment, including a racetrack SC dipole magnet 110, two pairs of electrodes 120, including two sets of cathodes (+) 121 and two sets of anodes (−) 122, an electrically conducting medium 130, and two separate axial ducts 140 surrounding the electrically conducting medium 130, which as described above, is an MHD. The cryostat or vacuum vessel surrounds the racetrack SC dipole magnet 110 and thermally isolates the racetrack SC dipole magnet 110 from its surroundings. Both axial ducts 140 have an intake 160 where the electrically conducting medium 130 enters and an exhaust 170 where the medium 130 exits. When a voltage (ΔV) is placed across both pairs of electrodes 120 by an external power source, a current (I) 190 flows in the racetrack SC dipole magnet 110 to create a B-field 200, and a net thrust ($F_{Th}$) 185 is generated.

In this MHD embodiment, the racetrack SC dipole magnet 110 is powered by the external power supply 270 in the so-called common coil configuration, producing a B-field (200) that is horizontally oriented to both ducts 140, and not vertically oriented. To generate a net thrust 185, both sets of electrodes are placed at 90° to the B-field 200. The electrode current density ($J_{electrode}$) 210 in both ducts 140 are 90° (or nearly 90°) with respect to the generated B-field 200 to produce a net thrust 185. The two ducts 140 shown in this embodiment are square in cross-section but can be any cross-sectional shape depending upon the application.

Figure 12:
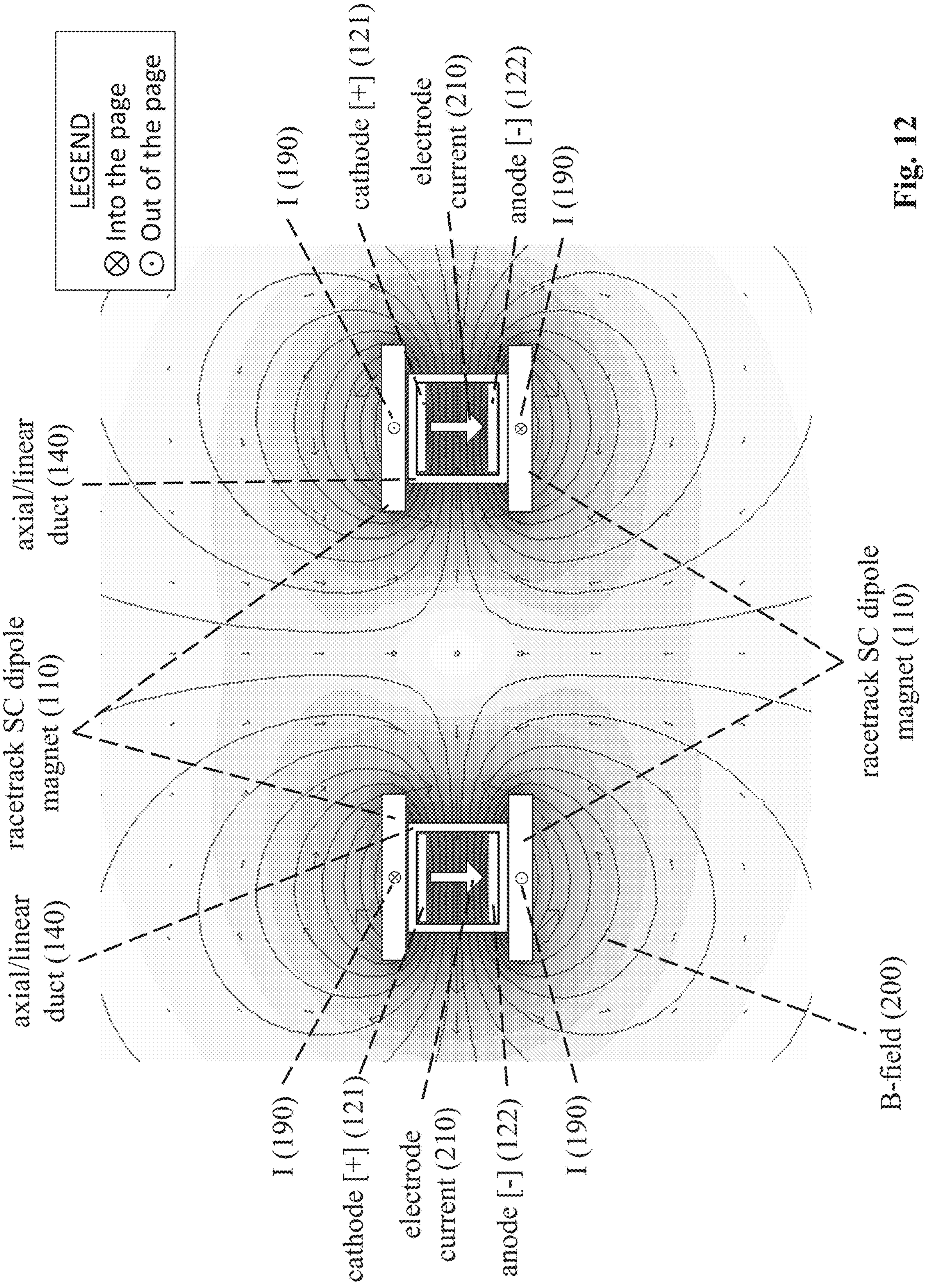
FIG. 12 depicts the magnetic field profile of a racetrack dipole magnet that has been electrically powered in the common coil configuration with respect to the electrodes and both ducts, according to an embodiment of the present disclosure.

FIG. 12 shows the two-dimensional B-field plot of a racetrack dipole magnet 110 electrically powered in a common coil configuration. The SC magnet current 190 of the top racetrack coil 190 is powered with equal magnitude, but in the opposite direction to the bottom coil of the SC dipole magnet 110. This produces of B-field 200 that is oriented horizontal to the axial duct 140. In this embodiment, the $J_{electrode}$ 210 is in the vertical (or near vertical) direction with respect to the B-field 200, and the cathode 121 and anode 122 pair are parallel to the SC racetrack coils 110. This embodiment enables the use of twin axial ducts 140 with a single SC dipole magnet 110.

Figure 13:
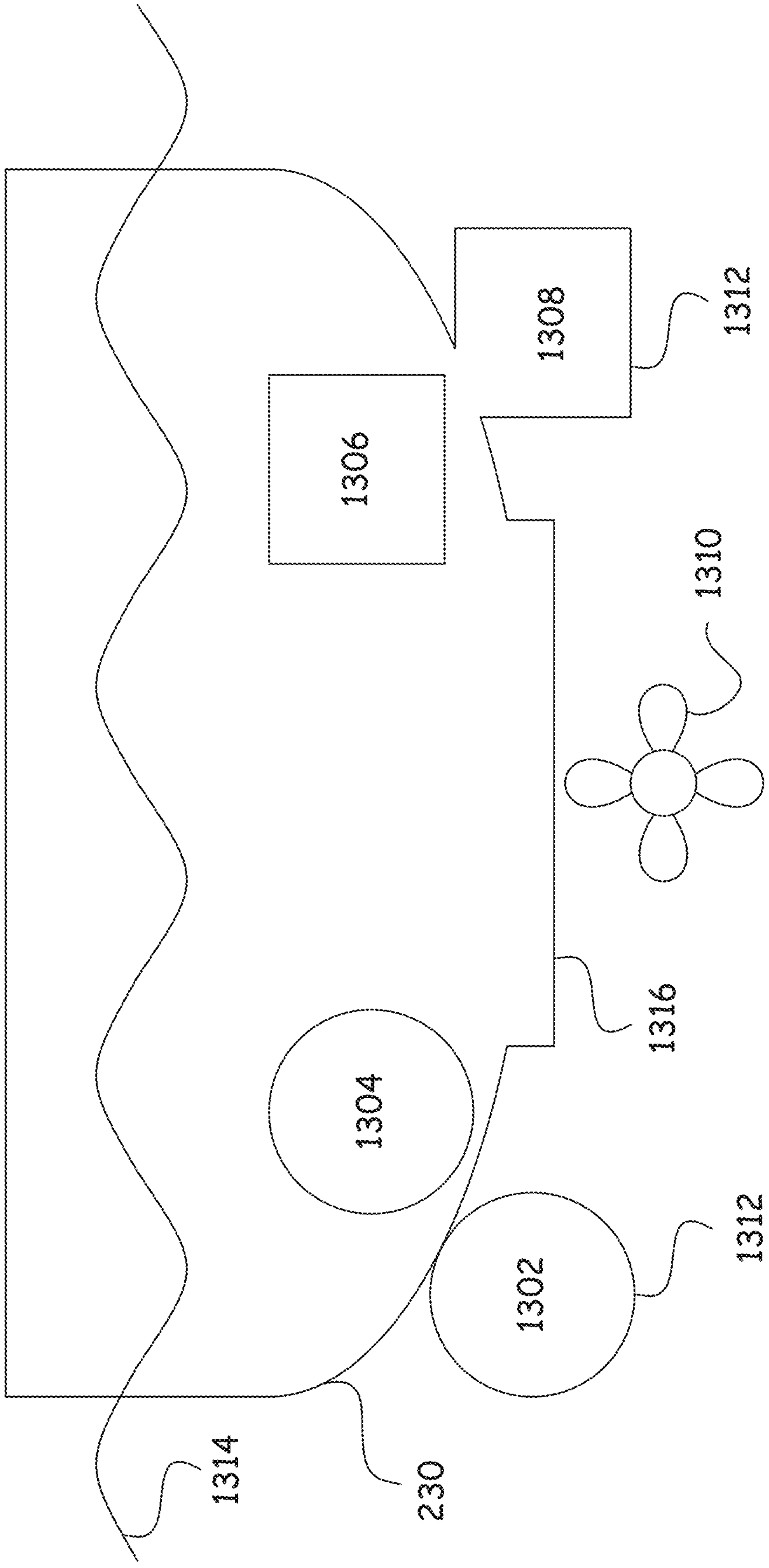
FIG. 13 depicts five MHD embodiments, including an internal, linear, ducted MHD, an external, linear ducted MHD, an internal, radial, ducted MHD, an external, radial, ducted MHD, a ductless MHD, with an impeller, according to an embodiment of the present disclosure.

FIG. 13 depicts five MHD embodiments on a common hull 230 buoyed in a waterline 1314. Such an embodiment as depicted would be unusual, but possible, more especially in subsets of the combined embodiment as depicted. In FIG. 13 there are representationally depicted an internal, linear, ducted MHD 1306, an external, linear ducted MHD 1308 (in a housing 1312 that is attached to the hull 230), an internal, radial, ducted MHD 1304, an external, radial, ducted MHD 1302 (in a housing 1312 that is attached to the hull 230), a ductless MHD 1316, and an impeller 1310.

As used herein, the phrase "at least one of A, B, and C" means all possible combinations of none or multiple instances of each of A, B, and C, but at least one A, or one B, or one C. For example, and without limitation: Ax1, Ax2+Bx1, Cx2, Ax1+Bx1+Cx1, Ax7+Bx12+Cx113. It does not mean Ax0+Bx0+Cx0.

The foregoing description of embodiments for this invention has been presented for purposes of illustration and description. For the purposes of clarity and brevity, only the so-called conductive MHD type has been illustrated and described, and the inductive MHD type has not been included. The figures and their descriptions provided in this disclosure are not intended to be exhaustive or to limit the invention to the precise form disclosed. Obvious modifications or variations are possible in light of the above teachings to one of ordinary skill in the art. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A magnetohydrodynamic propulsion device (MHD), comprising:

a superconducting magnet, a cryogenic refrigeration system adapted to cool the superconducting magnet, a vacuum cryostat surrounding the superconducting magnet, an electrode pair, and a housing adapted to mount the MHD to a vessel, wherein the superconducting magnet and the electrode pair are adapted to receive electrical power and generate a magnetic field, an electric field, and an electrode current density to produce thrust in an electrically conducting medium in contact with the MHD.

2. The MHD of claim 1, wherein the housing comprises at least one of an axial duct, a radial duct, and a ductless configuration.

3. The MHD of claim 1, wherein housing is at least one of an inline unit internal to the vessel, an inline unit external to the vessel, and an external unit in at least one pod.

4. The MHD of claim 1, wherein the superconducting magnet is at least one of a racetrack dipole magnet, canted cosine theta dipole magnet, saddle dipole magnetic, overpass/underpass dipole magnet, common coil dipole magnet, and segmented toroid magnet.

5. The MHD of claim 1, wherein the superconducting magnet is at least one of an HTS magnet and an LTS magnet.

6. The MHD of claim 1, wherein the superconducting magnet is adapted to receive at least one of DC electrical power and AC electrical power.

7. The MHD of claim 1, wherein the electrode pair is adapted to receive at least one of DC electrical power and AC electrical power.

8. The MHD of claim 1, wherein the cryogenic refrigeration system is at least one of an active cryogenic refrigerator, and passive cryogenic system with thermal energy storage.

9. The MHD of claim 1, further comprising at least one of a persistent mode switch, semi-persistent mode switch, and intelligent current lead.

10. The MHD of claim 1, further comprising a magnetic permeable material adapted to shape the magnetic field and reduce a magnetic signature of the MHD.

11. A method of generating a thrust in an electrically conductive medium, the method comprising the steps of:
providing a magnetohydrodynamic propulsion device (MHD), comprising:
a superconducting magnet,
a cryogenic refrigeration system adapted to cool the superconducting magnet,
a vacuum cryostat surrounding the superconducting magnet,
an electrode pair, and
a housing adapted to mount the MHD to a vessel, and
immersing the MHD in the electrically conductive medium,
wherein the superconducting magnet and the electrode pair are adapted to receive electrical power and generate a magnetic field, an electric field, and an electrode current density to produce the thrust in the electrically conducting medium.

12. The method of claim 11, wherein the electrically conductive medium is sea water.

13. The method of claim 11, wherein the housing is disposed inside the vessel.

14. The method of claim 11, wherein the housing is attached externally to a hull of the vessel.

15. The method of claim 11, wherein the thrust can be reversed by reversing a polarity of the electrical power.

16. The method of claim 11, wherein the thrust can be reversed by rotating by 180° one of the superconducting magnet or a magnet associated with the electrode pair.

17. The method of claim 11, wherein a direction of the thrust is maintained by simultaneously switching a polarity of both the electrode pair and the superconducting magnet.

18. The method of claim 11, wherein a magnitude of the thrust is varied by adjusting at least one of (a) a current applied to the superconducting magnet, (b) a voltage applied across the electrode pair, and (c) a rotation of only one of the superconducting magnet or the electrode pair relative to each other.

19. The method of claim 11, wherein an active cryogenic refrigeration system is used during normal operations and a passive cryogenic refrigeration system is used during stealth operations.

20. A method of generating a thrust in an electrically conductive medium, the method comprising the steps of:
providing a magnetohydrodynamic propulsion device (MHD), comprising:
a superconducting magnet,
a cryogenic refrigeration system adapted to cool the superconducting magnet,
a vacuum cryostat surrounding the superconducting magnet,
an electrode pair, and
a housing adapted to mount the MHD to a vessel,
immersing the MHD in the electrically conductive medium,
wherein the superconducting magnet and the electrode pair are adapted to receive electrical power and generate a magnetic field, an electric field, and an electrode current density to produce a first portion of the thrust in the electrically conducting medium, and
providing an impeller adapted to produce a second portion of the thrust.

* * * * *